(12) United States Patent
Heng et al.

(10) Patent No.: US 7,672,377 B2
(45) Date of Patent: Mar. 2, 2010

(54) METHOD AND SYSTEM FOR VIDEO ENCODING AND TRANSCODING

(75) Inventors: Wei Jyh Heng, Artarmon (AU); Wei Zhou, Penshurst (AU); Jianwei Wang, Larkspur, CA (US); Marwan A. Jabri, Tiburon, CA (US); Brody Kenrick, San Francisco, CA (US)

(73) Assignee: Dilithium Holdings, Inc., Petaluma, CA (US)

( * ) Notice: Subject to any disclaimer, the term of this patent is extended or adjusted under 35 U.S.C. 154(b) by 0 days.

(21) Appl. No.: 11/738,816

(22) Filed: Apr. 23, 2007

(65) Prior Publication Data

US 2007/0286286 A1 Dec. 13, 2007

Related U.S. Application Data

(60) Provisional application No. 60/793,747, filed on Apr. 21, 2006.

(51) Int. Cl.
*H04N 7/12* (2006.01)
*H04N 11/02* (2006.01)

(52) U.S. Cl. .............................. 375/240.16; 375/240.17

(58) Field of Classification Search ............ 375/240.16, 375/240.17, 240.26
See application file for complete search history.

(56) References Cited

U.S. PATENT DOCUMENTS 5,897,219 A 4/1999 Yoo et al.
5,940,130 A 8/1999 Nilsson et al.
6,125,141 A * 9/2000 Sato et al. .................... 375/240
6,339,619 B1 1/2002 Sugiyama
6,434,197 B1 * 8/2002 Wang et al. ............ 375/240.29
6,456,661 B1 9/2002 Morel (Continued)

FOREIGN PATENT DOCUMENTS

EP 1 111 796 6/2001
WO WO 01/95633 12/2001

OTHER PUBLICATIONS

Dogan et al., Efficient MPEG-4/H/263 Video Transcoder for Interoperobility of Hetergeneous Multimedia Networks. Electronics Letters, vol. 35, Issue 11. May 27, 1999, pp. 863-864.

(Continued)

*Primary Examiner*—Tung Vo
*Assistant Examiner*—Anner Holder
(74) *Attorney, Agent, or Firm*—Townsend and Townsend and Crew LLP

(57) ABSTRACT

A method of removing a motion vector from a group of motion vectors used in an encoding process includes providing a list of motion vectors, selecting an initial motion vector from the list of motion vectors, and providing an intermediate motion vector using a motion vector refinement process. The motion vector refinement process uses, in part, the initial motion vector. The method also includes forming a region defined by one or more parameters associated with the initial motion vector and one or more parameters associated with the intermediate motion vector, selecting an additional motion vector from the list of motion vectors, determining that the additional motion vector points into the region, and modifying a state of the additional motion vector.

22 Claims, 16 Drawing Sheets

U.S. PATENT DOCUMENTS

| | | |
|---|---|---|
| 6,647,061 B1 | 11/2003 | Panusopone et al. |
| 6,671,322 B2 | 12/2003 | Vetro et al. |
| 6,934,334 B2 | 8/2005 | Yamaguchi et al. |
| 6,999,512 B2 | 2/2006 | Yoo et al. |
| 7,110,451 B2 | 9/2006 | Nakamura et al. |
| 7,142,601 B2 | 11/2006 | Kong et al. |
| 7,145,946 B2 | 12/2006 | Lee |
| 7,151,799 B2 | 12/2006 | Kato et al. |
| 7,170,932 B2 | 1/2007 | Vetro et al. |
| 2001/0047517 A1 | 11/2001 | Christopoulos et al. |
| 2004/0057521 A1 | 3/2004 | Brown et al. |
| 2004/0158647 A1 | 8/2004 | Omura |
| 2005/0207663 A1* | 9/2005 | Zeng et al. .................. 382/236 |

OTHER PUBLICATIONS

Iwasaki et al., Video Transcoding Technology for Wireless Communication Systems, Vechicular Technology Conference Proceedings, 2000. VTC 2000 Tokyo, 2000 IEEE 51st vol. 2, May 15-18, 2000, pp. 1577-1580.

Lei et al., H.263 Video Transcoding for Spatial Resolution Downscaling, International Conference on Information Technology: Coding and Computing, Apr. 8-10, 2002, pp. 425-430. <<Web link: http://citeseer.ist.psu.edu/617391.html>>.

Liang et al., Compressed Domain Transcoding Solutions for MPEG-4 Visual Simple Profile and H.263 Baseline Videos in 3GPP Services and Application, vol. 52, Issue 2, May 2006 pp. 507-514.

International Search Report and Written Opinion of PCT Application No. PCT /US07/67230, mailed Sep. 17, 2008, 11 pages total.

* cited by examiner

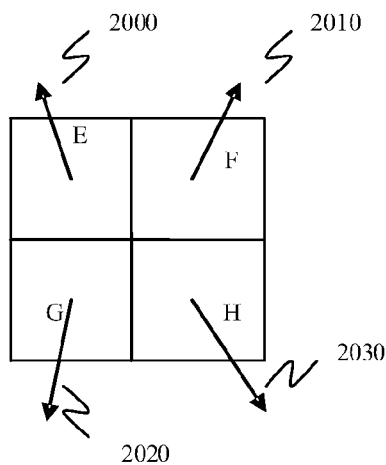
Fig 2A
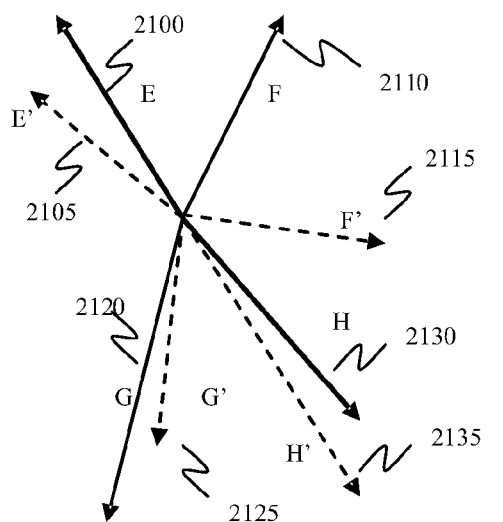
Fig 2B
| SAD of initial motion vectors | SAD of final motion vectors |
|---|---|
| $SAD_E = 700$ | $SAD_{E'} = 500$ |
| $SAD_F = 1200$ | $SAD_{F'} = 600$ |
| $SAD_G = 400$ | $SAD_{G'} = 350$ |
| $SAD_H = 1100$ | $SAD_{H'} = 1000$ |
Fig 2C

| Transcoding Technique | Average number of cycle |
|---|---|
| Transcoding using technique according to embodiments of the present invention | 703303366 |
| Transcoding using Full Search Motion Vector Estimation | 1689427911 |

Fig. 15

METHOD AND SYSTEM FOR VIDEO ENCODING AND TRANSCODING

CROSS-REFERENCES TO RELATED APPLICATIONS

The present application claims benefit under 35 U.S.C. § 119(e) of U.S. Provisional Patent Application No. 60/793,747, filed Apr. 21, 2006, which is incorporated herein by reference in its entirety.

BACKGROUND OF THE INVENTION

The present invention relates to the field of digitally compressed motion video and to optimizing the transcoding or encoding of digitally compressed motion video. More particularly, embodiments of the present invention relate to methods and systems for reducing computation required to calculate optimal motion vectors from a set of initial motion vectors during video encoding.

Several video coding standards have been introduced for digital video compression. Among them are MPEG-1, MPEG-2, and MPEG-4 part 2 standardized by the ISO committee, H.261 and H.263 standardized by the ITU committee and H.264, also known as Advanced Video Coding (AVC) or MPEG-4 part 10, standardized jointly by both the ISO and ITU committee. The video compression standards define decoding techniques and part of the encoding techniques, and the modules used for compressing video include variable length coding, motion compensation, quantization and frequency domain transform. To encode a video frame, the frame is divided into blocks, each block is then coded in one of several different ways, and these include intra, inter-predictive, intra-predictive or non-coded.

To encode a block using inter-predictive coding, the block can be further divided into partitions of different sizes, and a motion vector can be used in each partition to point to another partition of the same size in a reference frame. The value of the differences between the two partitions, known as a residue, is obtained, and can then be transformed using a technique such as the discrete cosine transform (DCT). The transformed data is quantized before being entropy coded to obtain the compressed bitstream. Though the method of encoding the motion vectors and residue are well defined within each standard, the technique for searching for one motion vector to confidently predict the optimal location for a partition in the reference frame, known as motion estimation, is not defined within most of the standards.

Motion estimation is one of the most resource intensive operations for video encoding. To confidently find the global optimum motion vector used to encode a block, it is necessary to examine all possible motion vectors in every reference frame, within the values/ranges restricted by the standard. The discovery of the optimum motion vectors enables the bitstream to be encoded with the minimum bitrate and the maximum quality. This process results in very high computation resource requirement. Alternatively, in general, a sub-optimal motion vector, as compared to the global motion vector, can be found by using fast motion estimation techniques, such as the diamond search for the motion estimation, at the expense of increasing bitstream size for the same quality, or conversely reduced quality at a constrained bit rate.

In applications such as video encoding in a mobile device and video transcoding or transrating for a mobile channel in multimedia gateway, where real-time encoding is utilized, coding speed is also important. It is also desirable to reduce power consumption and reduce resource requirements used for video encoding.

On the other hand, due to the network resource limitations, it is also desirable to keep the bitrate low for the same compressed video quality. Thus, there is a need in the art for improved methods and systems for finding the right balance between compression performance and computation resource requirements to predict the optimal parameter for encoding.

SUMMARY OF THE INVENTION

The present invention relates generally to optimizing the transcoding or encoding of digitally compressed motion video, and particularly, to a methodology for reducing computation utilized to calculate one optimal motion vector from a set of initial motion vectors used to encode the video. A first embodiment of the invention eliminates initial motion vectors that are within a window bounded by the motion vectors extracted during a motion refinement process. A second embodiment of the invention utilizes the coding cost of the initial motion vectors that lead to the final optimal motion vectors to derive an early termination criteria for the refinement of the initial motion vectors. A third embodiment of the present invention selects a median motion vector from multiple motion vectors by utilizing the size of the partition to which the motion vector belongs.

According to an embodiment of the present invention, a method of removing a motion vector from a group of motion vectors used in an encoding process is provided. The method includes providing a list of motion vectors, selecting an initial motion vector from the list of motion vectors, and providing an intermediate motion vector using a motion vector refinement process. The motion vector refinement process uses, in part, the initial motion vector. The method also includes forming a region defined by one or more parameters associated with the initial motion vector and one or more parameters associated with the intermediate motion vector and selecting an additional motion vector from the list of motion vectors. The method further includes determining that the additional motion vector points into the region and modifying a state of the additional motion vector.

According to another embodiment of the present invention, a method of selecting a motion vector adapted for use in an encoding process is provided. The method includes a) providing a list of motion vectors, b) selecting a first motion vector from the list of motion vectors, c) determining a first coding cost associated with the first motion vector, and d) defining a minimum coding cost based on the first coding cost. The method also includes e) selecting another motion vector from the list of motion vectors and f) determining another coding cost associated with the another motion vector. If the another coding cost is less than the first coding cost, then the method provides a refined motion vector using a motion vector refinement process as a function of the another motion vector and determines a refined coding cost associated with the refined motion vector. If the refined coding cost is less than the minimum coding cost, then the method updates the minimum coding cost based on the refined coding cost, updates the first coding cost based on the another coding cost, and provides a temporary motion vector based on the refined motion vector. Steps e) through the if-then loops are repeated for other motion vectors in the list of motion vectors and an encoding motion vector is selected for use in the encoding process.

According to an alternative embodiment of the present invention, a method of computing a motion vector for a block having a plurality of partitions is provided. The method includes receiving a list of motion vectors. Each of the motion vectors in the list of motion vectors is associated with one of the plurality of partitions. The method also includes assigning a weight for each of the plurality of partitions, extracting a first component from each of the motion vectors to provide a first list, and associating the weight for each of the plurality of partitions with the first component. The method further includes sorting the first list based on the first component, summing the weight for each of the plurality of partitions to compute a total value, and summing the weight for each of the plurality of partitions associated with the first component until a first component sum is greater than or equal to a fraction of the total value. Additionally, the method includes determining a first component value and computing the motion vector as a function of the first component value.

Many benefits are achieved by way of the present invention over conventional techniques. For example, embodiments of the present invention provide near optimal motion refinement results. In addition, such performance is achieved using a reasonable number of execution cycles. Embodiments of the present invention reduce the computation requirement of re-estimating a new motion vector in the presence of a plurality of initial motion vectors, by eliminating those initial motion vectors that are less probable to be able to deduce the final locally optimal motion vector from a list of initial motion vectors. Another embodiment eliminates the initial motion vectors that are likely to give similar results during motion refinement from a list of initial motion vectors. Yet another embodiment speeds up the elimination of initial motion vectors from the list of initial motion vectors by analyzing them in a sequence so as to maximize the chance of analyzing the more likely to be selected of the initial motion vector first before other less likely to be selected initial motion vectors, which ultimately results in the locally optimal motion vector. In a particular embodiment, the memory utilized is reduced and the speed of selecting a median motion vector from a list of motion vectors is increased. Depending upon the embodiment, one or more of these benefits, as well as other benefits, may be achieved.

The objects, features, and advantages of the present invention, which to the best of our knowledge are novel, are set forth with particularity in the appended claims. Embodiments of the present invention, both as to their organization and manner of operation, together with further objects and advantages, may best be understood by reference to the following description, taken in connection with the accompanying drawings.

BRIEF DESCRIPTION OF THE DRAWINGS

FIG. 2A is an example used in illustrating early termination according to an embodiment of the present invention;

FIG. 2B illustrates the motion vectors extracted from the block used in illustrating an example of early termination according to an embodiment of the present invention;

FIG. 2C is a table showing the coding cost of the initial motion vector and the coding cost of the final motion vector after motion refinement using the early termination process according to an embodiment of the present invention;

FIG. 15 illustrates the computational cycles obtained from transcoding H.264 to H.263 video bitstream using full search motion vector estimation and the motion vector estimation techniques provided by embodiments of the present invention.

DETAILED DESCRIPTION OF SPECIFIC EMBODIMENTS

Figure 1A:
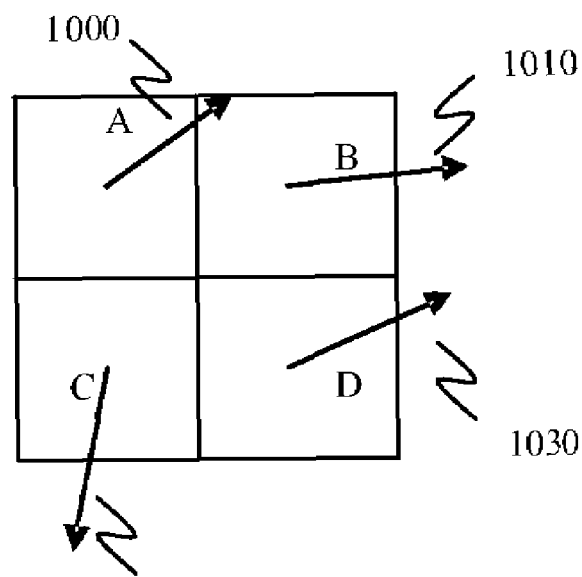
FIG. 1A is an example used in illustrating the redundant motion vector elimination situation provided according to an embodiment of the present invention.

An embodiment of the present invention provides methods and systems to reduce or eliminate initial motion vectors that are less likely to be useful and that are within a region bounded by the motion vectors extracted during a refinement search. Another embodiment of the present invention provides methods and systems that utilize a coding cost of the initial motion vector that will lead to the final optimal motion vectors to derive an early termination criterion for the refinement of other initial motion vectors that are less likely to be optimal.

An alternative embodiment of the present invention provides methods and systems to select a median motion vector from multiple motion vectors by utilizing the size of the partition to which the motion vector belongs. Yet another embodiment provides methods and systems that analyze the initial motion vectors during video transcoding by first using one or more motion vectors with higher accuracy from a block in the incoming video, followed by motion vectors obtained from the encoded blocks in the outgoing video, followed by a plurality of motion vectors obtained from the incoming decoded video, where each analysis involves elimination or identification of the less likely to be optimal initial motion vectors. The motion vector with higher accuracy is a median or mean motion vector.

Embodiments of the present invention are useful, but not limited to, the application of video transcoding and encoding. The methods and systems described herein are of particular usefulness where the compression ratio and video quality of the compressed outgoing video is important. This is especially so when video standard with higher compression ratio is transcoded to a video standard with lower compression ratio, such as from H.264 video to H.263 video, or when video bitstream from a higher bandwidth network is transcoded to a limited bandwidth network, such as from wired network to mobile wireless network. One such application is the transcoding of H.264 to H.263 video in a multimedia gateway in a 3GPP network, whereby the H.264 video originated from a packet side is transcoded to H.263 video in a circuit side wireless network. Such transcoding is utilized when a 3G mobile phone that supports H.263 decoding but does not have a built in H.264 decoder is to receive the video bitstream content.

In the following description, the terms block, macroblock, partition, and sub-partition of a macroblock are interchangeable depending on the context on which the invention is used. The block, macroblock, partition and sub-partition of a macroblock do not need to be restricted to a square/rectangular shape. In one embodiment, they can be arbitrary in shape and size. The use of these various terms should be obvious to those skilled in the art when the invention is applied in the context of motion estimation. The term 'optimal motion vectors' means local optimal motion vector being calculated at the time of the operation, and may or may not be a global optimal motion vector.

One of the most expensive operations in the encoding of compressed video is the prediction of motion vectors for encoding inter-predicted blocks. To speed up the video encoding, motion vectors are reused during transcoding or encoding, and the motion vectors are projected for reuse during transrating or transizing. The motion vectors to be used for prediction include those from the blocks that have been previously encoded, or specifically in case of video transcoding, directly from the decoded or partially decoded video. In many circumstances during a transcoding operation, the motion vectors copied directly from other blocks in the encoded video, or copied directly from the incoming decoded video during transcoding or transrating, are not optimal for re-encoding. This can be due to many reasons.

In the case of reusing the motion vectors from the blocks that have already been encoded, the optimal motion vector can differ due to the difference in picture content, or a change of encoding parameter such as quantization parameter, or clipping/restricting of motion vector as specified by a standard. In the case of transcoding from one compressed video format to another, the optimal motion vector for encoding may differ from the motion vectors of the decoded video block due to restrictions imposed by the standard, or the quantization parameter, which both affect the quality of the compressed video. To improve the accuracy of the motion vector used for video encoding, a motion refinement or motion re-estimation is applied, by using the transferred motion vector as the initial position for the re-estimating the motion vectors.

Fast search is usually adopted to speed up the process of motion refinement or motion re-estimation. The technique involves using an initial motion vector as the current motion vector and testing the coding cost of a set of derived motion vectors that is different by a specific amount from the original initial motion vector, for example, ±1 of the value of its respective x and y components. If one of the derived motion vectors has a coding cost that is lower than the coding cost of the current motion vector, the current motion vector then becomes the derived motion vector with the lowest coding cost among all its derived motion vectors. The subsequent derived motion vector for the current motion is then tested again using the same procedure to find the motion vector with lowest coding cost, and the test is subsequently repeated until the coding cost of the current motion vector is the lowest among its surrounding derived motion vectors. The motion vector with the lowest coding cost is then selected as the motion vector of the block.

In one embodiment of the present invention, the coding cost is calculated using a Sum of Absolute Differences (SAD) between the current block and the block of similar size referenced by the motion vector in the reference frame. In another embodiment, the coding cost is calculated from a SAD when using a motion vector plus the cost of encoding the motion vector, adjusted using a weighting factor. The higher the coding cost, the less attractive the motion vector is and the lower its chances of being selected. Other techniques of calculating the coding cost that are known to those skilled in the art can be applied, as could other variations and alternatives.

This process is fast, however using only a single initial motion vector in fast motion refinement results in sub-optimal encoding since it can lead to the motion vector selected being trapped in the local minimal of the coding cost. To improve the accuracy of motion refinement, multiple initial motion vectors, instead of a single motion vector, can be selected as the initial motion vectors for motion refinement, and the refined motion vector with the lowest coding cost of all refined motion vectors is selected as the optimal motion vector. The motion vector is then used in motion compensation for encoding the block of the video. Such a technique of using multiple initial motion vectors for refinement, though improving the accuracy, increases the computational cycles.

To reduce the number of computational cycles for video encoding it is desirable to minimize the expensive computations such as performing motion refinement for every initial motion vectors. This can be achieved by eliminating the initial motion vectors that are less likely to be optimal even before motion refinement begins. As such, the order in which the motion vectors are inserted into the list is important as it will determine the average computational cycles required for analyzing the motion vectors. In the case where the most optimal motion vector is analyzed at the beginning of the list, the subsequent motion vectors will most probably be eliminated as their coding cost can be larger than that of the most optimal motion vectors, thus reducing the computational cycles required for motion refinement of the motion vectors which will not be optimal. If the motion vectors with lower coding costs are inserted later in the list, the motion vectors with higher coding cost will have to be analyzed first, thus increasing the computational cycles used in motion refinement of these motion vectors. It is preferable to place the motion vector with a higher probability of being optimal in the beginning of the list.

The initial motion vectors can be obtained from various possible sources such as from the decoder (in transcoding) or encoder (in both encoding and transcoding). One such possibility is the motion vectors from the previously decoded macroblocks or macroblock partition from the decoder in the case where transcoding is being employed. Another possibility is the motion vectors from the previously encoded macroblock partition from the encoder. Another possibility is that preset motion vector, such as zero motion vector, can be used. Another possibility is to use the derived motion vector according to some predetermined formulation, for example, from the prospective projection derived using other motion vectors within the video. Variations, combinations and alternatives to how the motion vectors are obtained would be apparent to those skilled in the art.

To reduce the computational cycles, a projected motion vector or motion vectors with the highest probability of being optimal are first appended to the front of the list. In most cases, this is usually from the decoded video in the case of transcoding. However, the motion vector can be from encoded video if the decoded motion vector is not available, for example, during an encoding, or that the current decoded macroblock is an intra macroblock and the current encoded macroblock needs to be an inter macroblock during a transcoding. The motion vector can be also be derived from the encoded video if the motion vectors from the encoded video is believed to be more accurate than such motion vector derived from decoded macroblock. For example, if the motion vectors in the encoded video is found to appear in a more orderly or trackable/predictable manner than the motion vectors in the decoded video. This is possible when the quantization parameter of the incoming and outgoing videos are different, or that filtering is utilized in the encoded video, or that the encoded outgoing video contains more inter macroblocks than the decoded video, or any other variation that is known to those of ordinary skill in the art in the field of video encoding or transcoding.

In one embodiment of the invention concerning video transcoding, the median motion vector determined from the block of the same spatial location in the incoming decoded video is the first motion vector appended to the list of initial motion vectors. This is because the median motion vector from the incoming video is very likely to be quite accurate in predicting the final optimal motion vector. The x and y components of the median motion vectors can be selected from different motion vectors. For illustrative purpose, both components are selected from the same motion vector in the present description however this need not be the case. In another embodiment, the mean values of the motion vectors can be used, by averaging all the respective component values of the selected motion vectors. In yet another embodiment, one motion vector from the largest partition in the current decoded macroblock is selected if the current decoded macroblock contain multiple partitions, or the motion vector of the macroblock is selected if the macroblock contains only one partition.

Following that, the motion vectors from the previously encoded blocks of the outgoing encoded video, for example, the motion vectors of the previously encoded blocks at the left, top, top left and top right are then appended to the list of initial motion vectors if the video is encoded in the scan line order, since they are most likely to resemble the final optimal motion vector of the current block after refinement. In the case where incoming video is not available, such as in video encoding alone, the neighboring motion vectors are used to predict the current motion vector, so they are considered to be the next most potentially likely initial motion vector. Finally, the rest of the decoded motion vectors from the blocks in the incoming video are appended as they are the motion vectors with lower probability of being selected as optimal motion vectors. In another embodiment, other motion vector such as zero motion vector, or motion vectors projected from the prospective global motion, can also be appended to the list. The motion vectors in the list are then analyzed in a first-in-first-out order, variations and alternatives exist for the list construction and processing order as would be recognized by those skilled in the arts.

In the description that follows, the macroblock encoding and decoding are assumed to be in scan line order, in which during the respective encoding and decoding of a macroblock, its left, top, top left and top right macroblocks are assumed to be available. In the case where random order, or non scan line, encoding or decoding is used, for example, in H.264 encoded bitstream when arbitrary slice order (ASO) or flexible macroblock ordering (FMO) is enabled, the availability of the neighboring macroblocks can be different. In those cases, the motion vectors of other neighboring available macroblocks, not restricted to the left, top, top left and top right macroblocks, can be used.

One embodiment of the invention is explained with reference to FIG. 7. This involves direct transcoding where the frame rate, resolution and frame size of the incoming and outgoing videos are the same. A macroblock containing three partitions 7150, 7160 and 7170 in the decoded frame segment 7100 is being transcoded to the macroblock 7250 in the encoded frame segment 7200. The median motion vectors 7310 which are calculated from the partition 7150, 7160 and 7170 are first inserted into the front of the list 7300. The motion vectors from the neighboring macroblocks of the current encoded macroblock 7250, which include the left encoded macroblock 7240, the top encoded macroblock 7220, the top left encoded macroblock 7210 and the top right encoded macroblock 7230, are placed in the list 7300 in that respective order. Following that, the motion vectors from the neighboring macroblocks of the current decoded macroblock, which include the left decoded macroblock 7140, the top decoded macroblock 7120, the top left decoded macroblock 7110 and the top right decoded macroblock 7130, are placed in the list 7300 in that respective order. The motion vectors in the list 7300 are then analyzed using the content in macroblock 7250 in a first-in-first out order to obtain an optimal motion vector from the motion vectors inserted into the list 7300, and the optimal motion vector is then assigned as the motion vector of encoded macroblock 7250, which is encoded and transmitted as part of the outgoing video.

Figure 7:
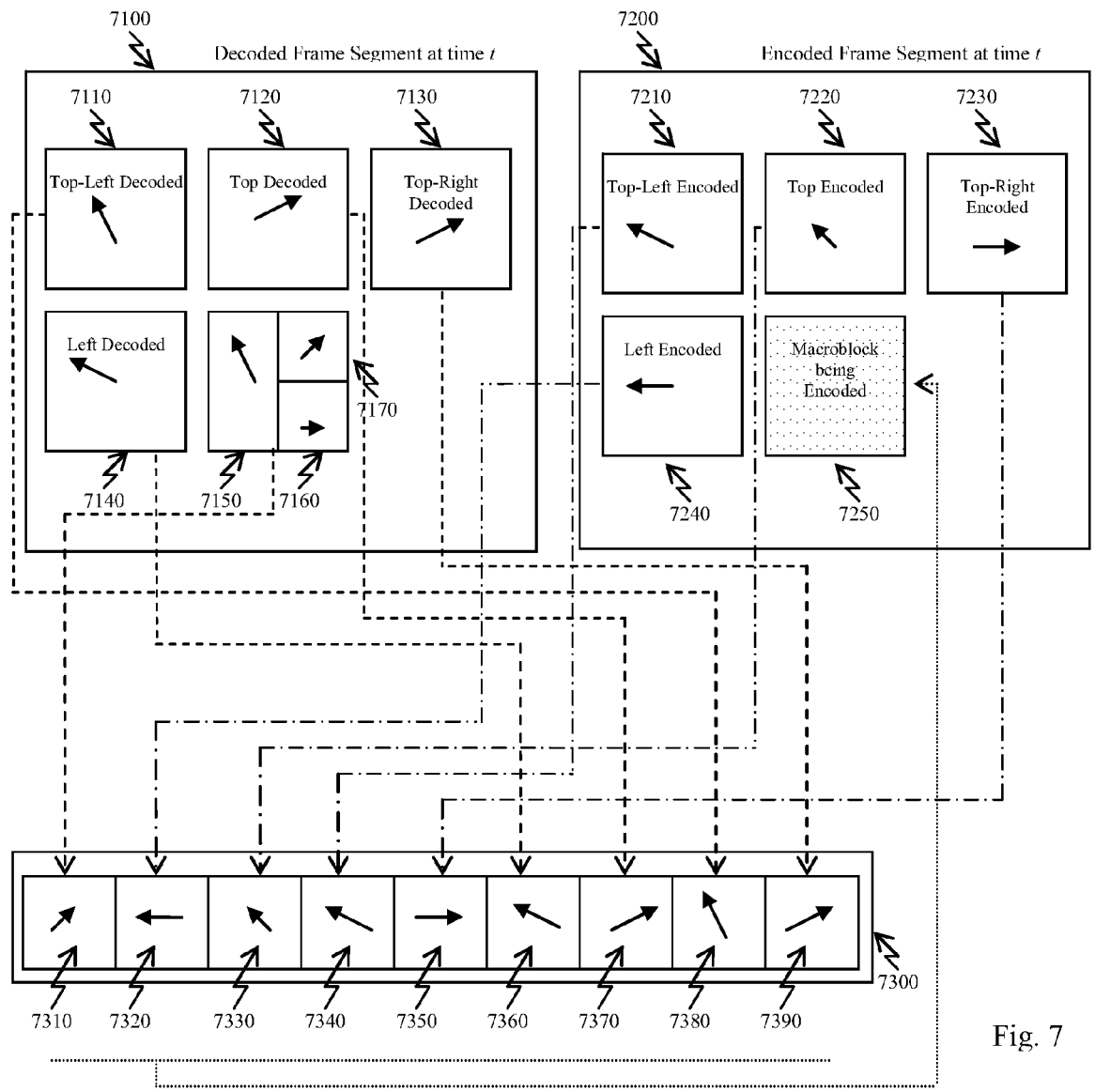
FIG. 7 illustrates an example of the motion vector analysis during transcoding of a macroblock without transrating or transizing according to an embodiment of the present invention.

In yet another embodiment, the procedure of inserting the motion vectors into the list 7300 is similar to that illustrated in FIG. 7, with an additional procedure that the x and y components of the median motion vectors are extracted separately from motion vectors of different partitions and the motion vectors which have one of their components selected as the medium motion vector, are inserted in the list after the median motion vector 7310 and before the motion vector 7320.

Figure 3:
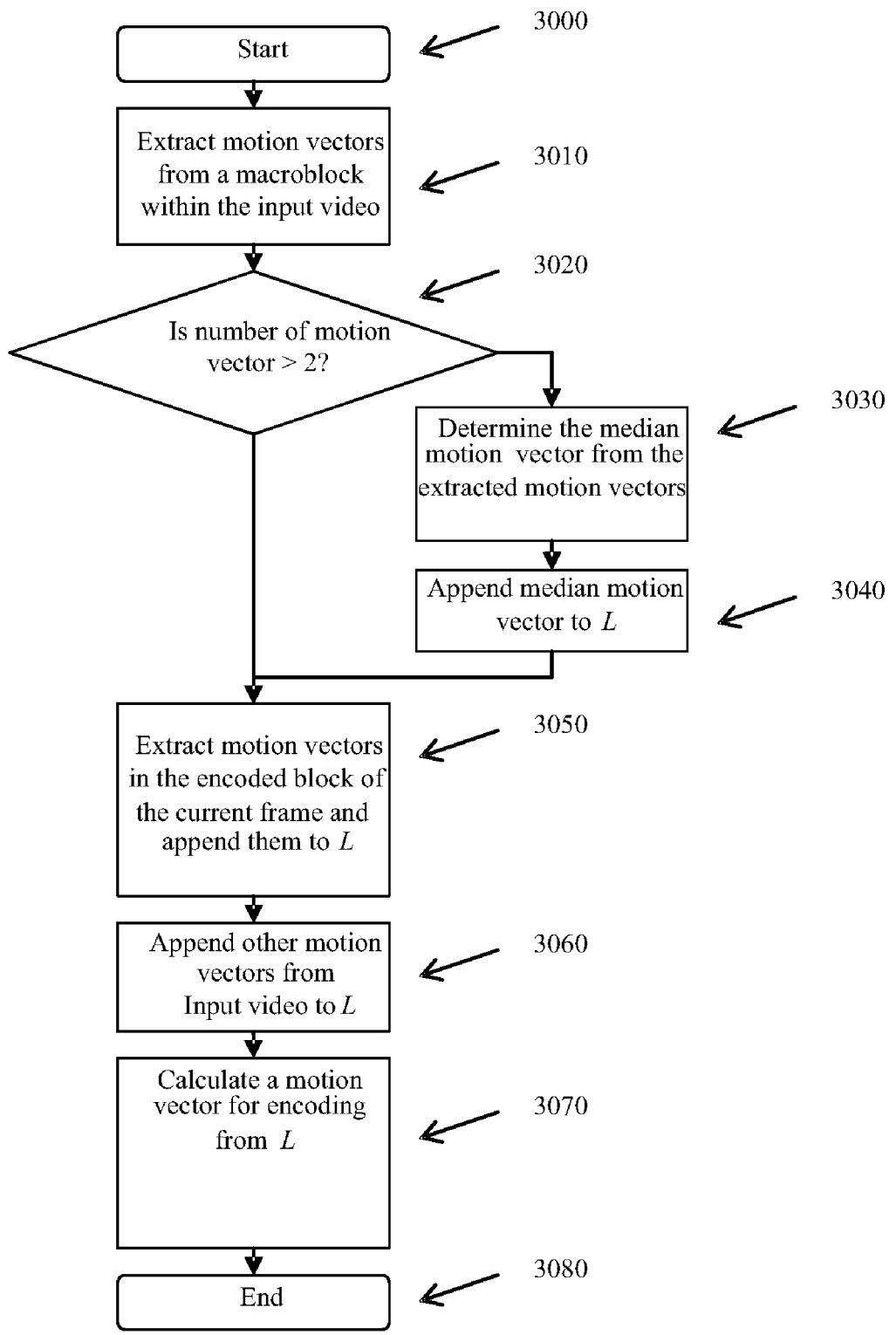
FIG. 3 illustrates a process for P block motion estimation during transcoding according to an embodiment of the present invention.

The process of an embodiment of P block motion estimation during transcoding is illustrated in FIG. 3. In this embodiment, the macroblocks are assumed to be decoded and encoded in a scan line order. The process starts with step 3000. In step 3010, the motion vectors from the decoded video are extracted. A decision 3020 is then made to determine if the number of motion vector within the block is more than two. If this is false, the process continues in step 3050.

Otherwise if the decoded video contains multiple motion vectors within one block, where it is possible if the input video is coded in H.264 or the AVC standard, the median motion vector is extracted from all the motion vectors within the block in step 3030. In a preferred embodiment, the median motion vector extraction with reference to FIG. 6 is used to extract the median motion vector. This median motion vector is appended to the front of the list L of initial motion vectors in step 3040. In step 3050, the motion vectors from the blocks that have already been encoded in the current frame of the video are extracted, and they are appended to list L. In a preferred embodiment, these motion vectors are from the blocks at the left, top left, top, and top right of the current block if the decoding is performed in a scan line fashion. Otherwise the motion vectors of the neighboring blocks of the current block are inserted. In step 3060, motion vectors from neighboring blocks of the current decoded macroblock of the input video are appended to the list L. The process continues in step 3070, to calculate one optimal motion vector for encoding from the motion vectors contains in list L. In a preferred embodiment, the motion vector is determined by an early termination technique described with reference to FIG. 5, whereby the initial motion vectors are analyzed in a first-in-first-out order and the analysis will be explained in detail later in the paragraphs. Finally, the process ended in step 3080.

Figure 8:
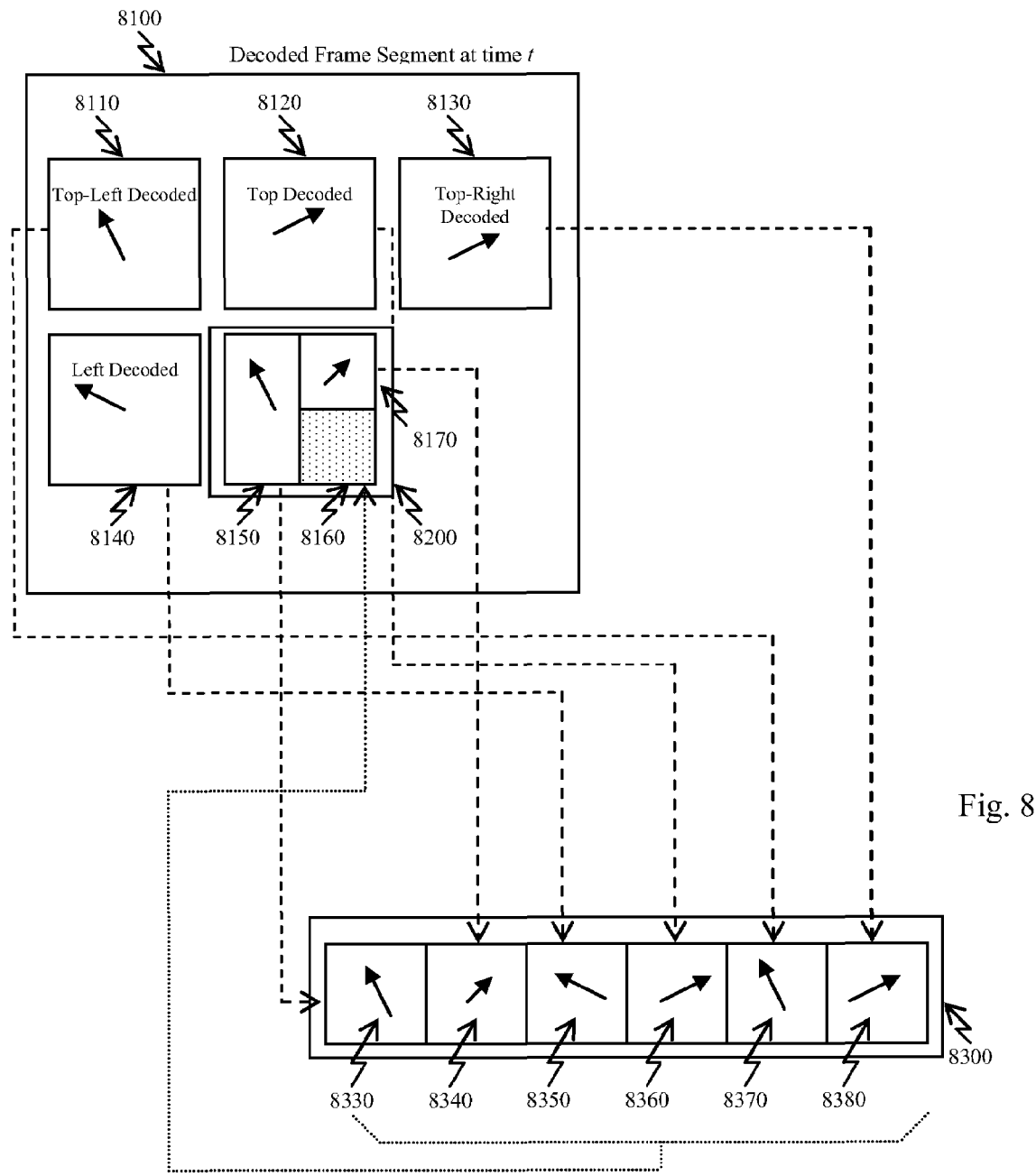
FIG. 8 illustrates an example of the motion vector analysis during encoding of a macroblock according to an embodiment of the present invention.

Another application of the invention is in encoding. An embodiment of such application is illustrated with reference to FIG. 8. The encoded macroblock to be encoded 8200 contains three partitions 8150, 8160 and 8170, and the motion vector is required in the encoding of the last partition 8160. The motion vectors in the top partition 8750 and the left partition 8150 are already available, and their respective motion vectors are placed in the list 8300. The motion vectors from the neighboring macroblocks of the encoded macroblock 8170, which include the left encoded macroblock 8140, the top encoded macroblock 8120, the top left encoded macroblock 8110 and the top right encoded macroblock 8130, are placed in the list 8300 in that respective order. The motion vectors in the list 8300 are then analyzed using the content in the partition 8160 in a first-in-first out order to obtain an optimal motion vector from the motion vectors inserted into the list 8300, and the optimal motion vector is then assigned as the motion vector of the partition 8160, which is encoded and transmitted as part of the outgoing video.

Figure 9:
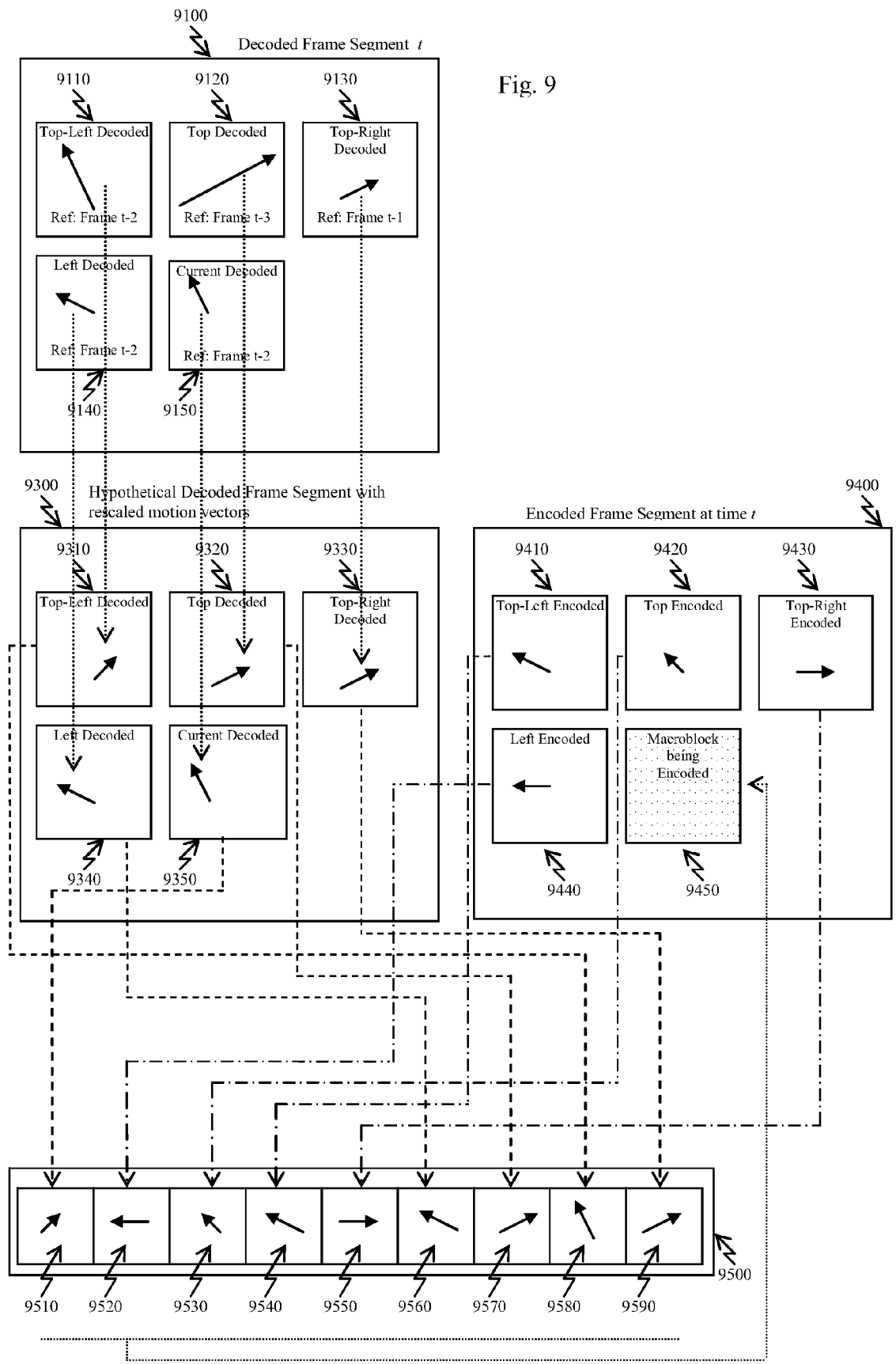
FIG. 9 illustrates an example of the motion vector analysis during the transcoding of a macroblock where the incoming video allows a plurality of reference frames according to an embodiment of the present invention.

Another application of the invention is in the transcoding of macroblocks where reference frames for each macroblock or partition of the macroblock are different. In this case, the motion vector cannot be used directly, but instead, has to be readjusted before analyzing. An embodiment of this type of application is illustrated with reference to FIG. 9. The macroblock containing 9150 in the decoded frame segment 9100 is being transcoded to the macroblock 9450 in the encoded frame segment 9400. The motion vectors in macroblocks 9110, 9120, 9130, 9140 and 9150 are rescaled to the appropriate value, according to the number of frames their respective reference frames are from the current frame. Techniques such as vector interpolation or other techniques can be applied to rescale the motion vectors. The respective resealed vectors are represented in the hypothetical decoded frame segment 9300 as the motion vectors in the macroblocks 9310, 9320, 9330, 9340 and 9350 respectively. The resealed motion vectors of the current decoded macroblock are then placed into the front of the list 9500. The motion vectors from the neighboring macroblocks of the current encoded macroblock 9450, which include the left encoded macroblock 9440, the top encoded macroblock 9420, the top left encoded macroblock 9410 and the top right encoded macroblock 9430, are placed in the list 9500 in that respective order. Following that, the resealed motion vectors 9340, 9320, 9310, 9330 from the neighboring macroblocks of the current decoded macroblock 9150, which are originally from the left decoded macroblock 9140, the top decoded macroblock 9120, the top left decoded macroblock 9110 and the top right decoded macroblock 9130, are placed in the list 9500 in the respective order. The motion vectors in the list 9500 is then analyzed using the content in macroblock 9450 in a first-in-first out order to obtain an optimal motion vector from the motion vectors inserted into the list 9500, and the optimal motion vector is then assigned as the motion vector of encoded macroblock 9450, which is encoded and transmitted as part of the outgoing video.

Figure 10:
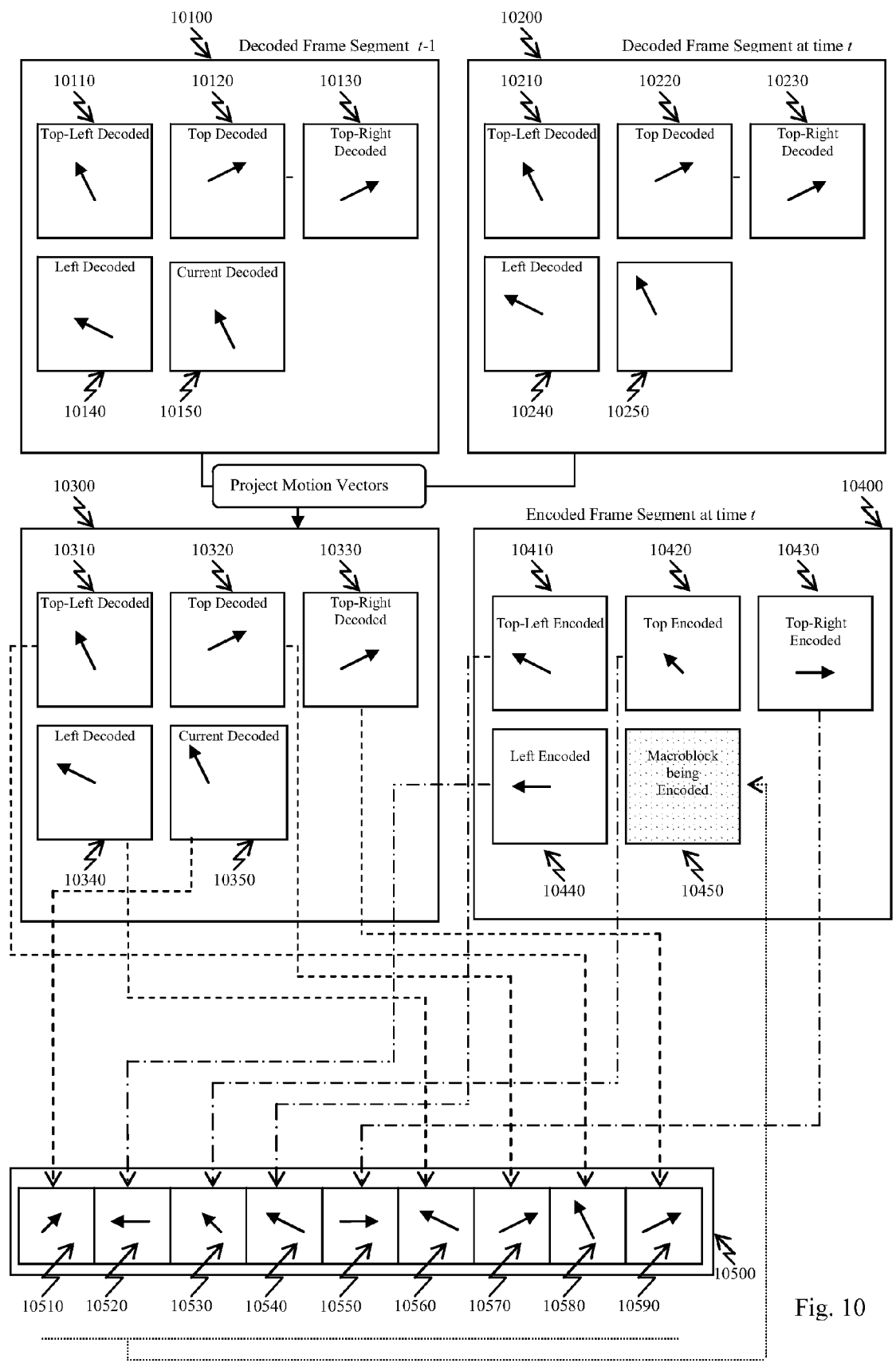
FIG. 10 illustrates an example of the motion vector analysis during the transcoding of a macroblock where the outgoing video frame rate is half that of the incoming video frame rate according to an embodiment of the present invention.

Another application of the invention is in the transrating of macroblocks where the frame rates of the incoming video and outgoing video are different. An embodiment of this type of application is illustrated with reference to FIG. 10. The example assumes that the frame rate of the outgoing video is half that of the incoming video, however the invention is not limited to this. To reduce the frame rate, information such as motion vectors from a plurality of incoming frames is combined to form information in a single frame. There are many techniques available which the motion vectors can be combined. In one embodiment, the motion vectors from the same spatial location are simply added together to produce the projected motion vectors. For example, the motion vectors in macroblock 10110, 10120, 10130, 10140 and 10150 in decoded frame segment 10100 at time t-1 are respectively added to the motion vectors in macroblocks 10210, 10220, 10230, 10240 and 10250 in decoded frame segment 10200 at time t, to produce a projected motion vectors in macroblocks 10310, 10320, 10330, 10340 and 10350 represented in a hypothetical decoded frame segment 10300. Other techniques that are known to those skilled in the art can be used to tabulate these motion vectors. The projected motion vector 10350 is first inserted into the front of the list 10500. The motion vectors from the neighboring macroblocks of the current encoded macroblock 10450, which include the left encoded macroblock 10440, the top encoded macroblock 10420, the top left encoded macroblock 10410 and the top right encoded macroblock 10430, are placed in the list 10500 in that respective order. Following that, the projected motion vectors from the neighboring macroblocks of the current decoded macroblock in the hypothetical decoded frame segment 10300, which include the left macroblock 10340, the top macroblock 10320, the top left macroblock 10310 and the top right macroblock 10330, are placed in the list 10500 in the respective order. The motion vectors in the list 10500 is then analyzed using the content in macroblock 10450 in a first-in-first out order to obtained an optimal motion vector from the motion vectors inserted into the list 10500, and the optimal motion vector is then assigned as the motion vector of encoded macroblock 10450, which is encoded and transmitted as part of the outgoing video.

Figure 11:
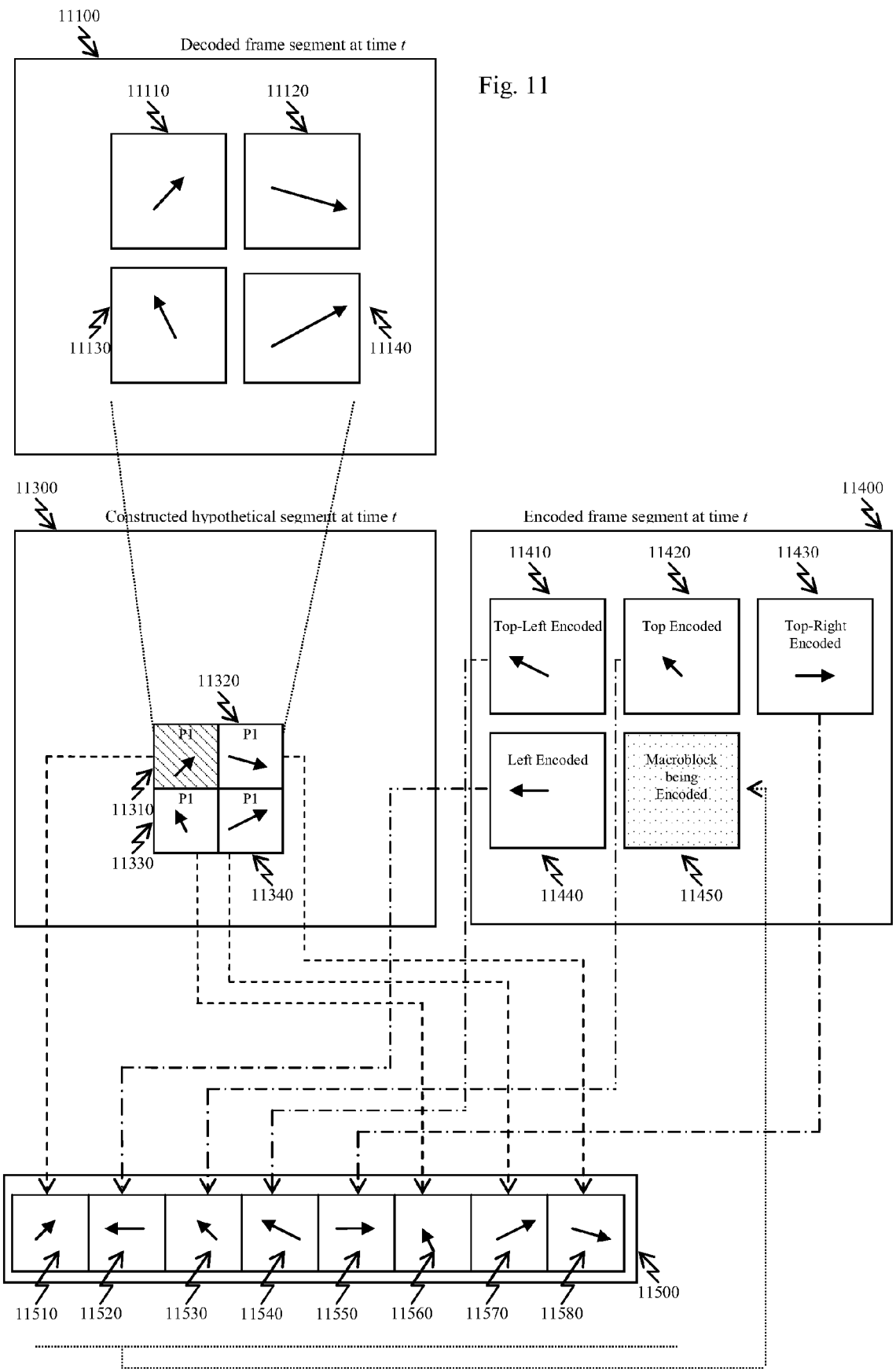
FIG. 11 illustrates an example of the motion vector analysis during the transizing of a macroblock according to an embodiment of the present invention.

Another application of the invention is in transizing of frame where the frame resolution of the incoming video and outgoing video are different. An embodiment of this type of application is illustrated with reference to FIG. 11. This embodiment assumes that the frame resolution of the outgoing video is half that of the incoming video, and each macroblock is downscaled by a factor of two during the transizing, this is not limiting however. In this case, the motion vectors in the decoded frame segment 11100, including the motion vectors in the macroblocks 11110, 11120, 11130, are divided by a factor of two and to produce projected motion vectors in blocks 11310, 11320, 11330, 11340 and 11350, which together form a macroblock, represented in a hypothetical decoded frame segment 11300. From the four blocks, a median motion vector is found from the block 11310, and it is inserted into the front of the list 11500. The motion vectors from the neighboring macroblocks of the current encoded macroblock 11450, which include the left encoded macroblock 11440, the top encoded macroblock 11420, the top left encoded macroblock 11410 and the top right encoded macroblock 11430, are placed in the list 11500 in that respective order. Following that, the rest of the rescaled motion vectors from the blocks 11320, 11330, 11340 are placed in the list 11500 in that respective order. The motion vectors in the list 11500 are then analyzed using the content in macroblock 11450 in a first-in-first out order to obtain an optimal motion vector from the motion vectors inserted into the list 11500, and the optimal motion vector is then assigned as the motion vector of encoded macroblock 11450, which is encoded and transmitted as part of the outgoing video.

In another embodiment, the frame is reduced to arbitrary size and the motion vectors are scaled appropriately. Other techniques that are known to those skilled in the art can be used to calculate these motion vectors.

Figure 12:
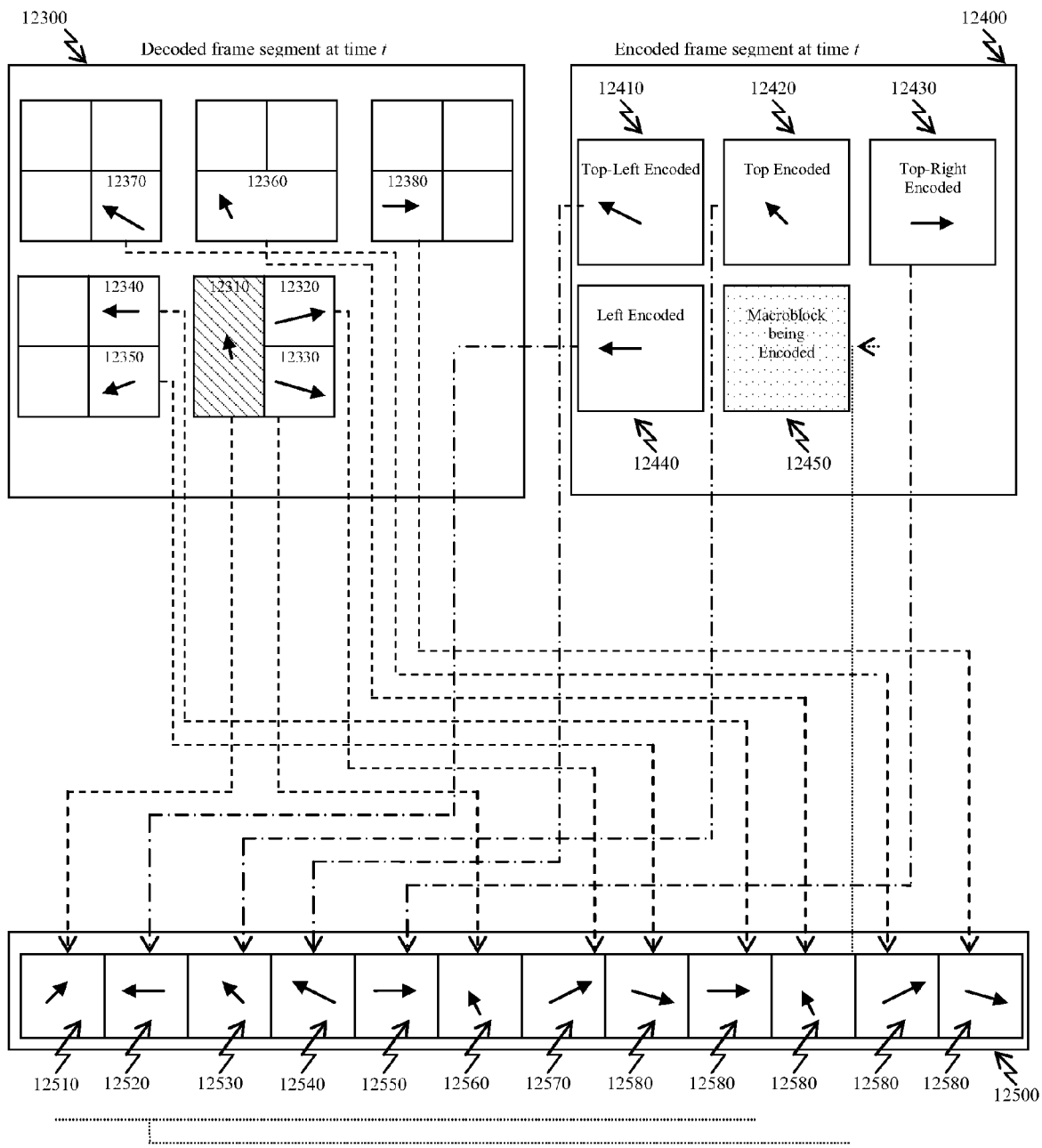
FIG. 12 illustrates an example of the motion vector analysis during the transcoding of a macroblock where the incoming macroblocks contains partition according to an embodiment of the present invention.

Another application of the invention is in the transcoding of macroblocks where the macroblock can consist of multiple partitions or blocks each with its own motion vector. An embodiment of this type of application is illustrated with reference to FIG. 12. This embodiment assumes that only motion vectors in the partitions of the blocks immediately next to the current decoded macroblock are used for analysis, other embodiments need not have this limitation. The current decoded macroblock containing three partitions 12310, 12320 and 12330 in the decoded frame segment 12300 is being transcoded to the macroblock 12450 in the encoded frame segment 12400. The median motion vector 12310 which is calculated from the partition 12310, 12320 and 12330 is first inserted into the front of the list 12300. The motion vectors from the neighboring macroblocks of the current encoded macroblock 12450, which include the left encoded macroblock 12440, the top encoded macroblock 12420, the top left encoded macroblock 12410 and the top right encoded macroblock 12430, are placed in the list 12400 in that respective order. Following that, the motion vectors from the neighboring macroblocks of the current decoded macroblock, which include the left decoded macroblock 12440, the top decoded macroblock 12420, the top left decoded macroblock 12410 and the top right decoded macroblock 12430, are placed in the list 12500 in that respective order. The motion vectors of the partition 12340, 12350, 12360, 12370 and 12380 which are the immediate neighbors of the current decoded macroblock are then placed subsequently in the list 12500. The list 12500 is then analyzed using the content in macroblock 12450 in a first-in-first out order to obtained an optimal motion vector from the motion vectors inserted into the list 12500, and the optimal motion vector is then assigned as the motion vector of encoded macroblock 12450, which is encoded and transmitted as part of the outgoing video.

Figure 13:
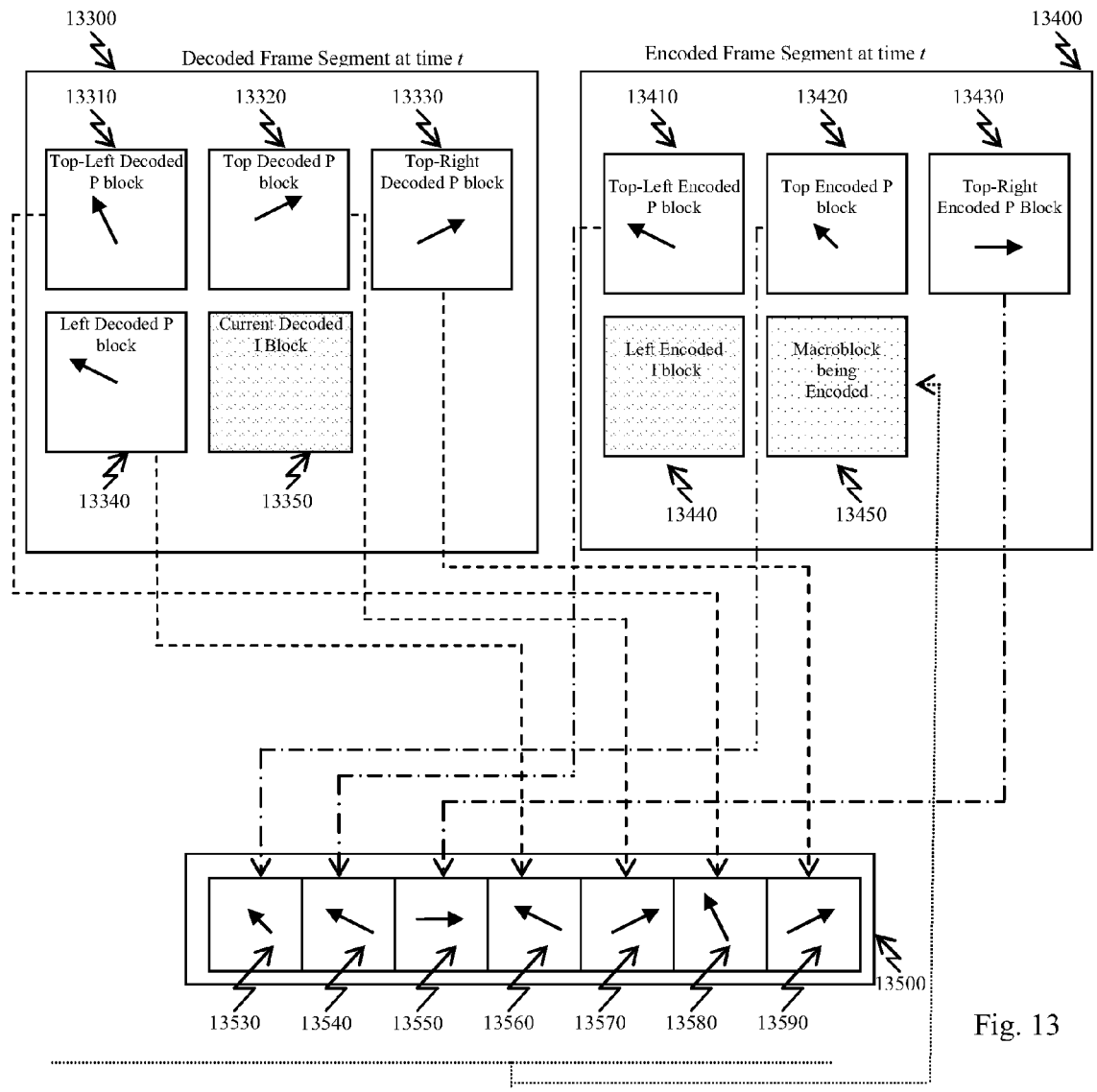
FIG. 13 illustrates an example of motion vector analysis during transcoding of a macroblock where incoming video and outgoing video consists of different block type according to an embodiment of the present invention.

Another application of the invention is in transcoding where the incoming video and outgoing video consists of different block types. An embodiment of this type of application is illustrated with reference to FIG. 13. There is no motion vector in the current decoded macroblock 13350 and left macroblock 13440 of the currently encoded macroblock because they are encoded as intra macroblocks. Thus, the more accurate motion vectors from encoded macroblocks for the outgoing video are first inserted into the list 13500. The motion vectors from the neighboring macroblocks of the macroblock currently being encoded 13450, which includes the left encoded macroblock 13440, the top encoded macroblock 13420, the top left encoded macroblock 13410 and the top right encoded macroblock 13430, are placed in the list 13500 in that respective order. Following that, the projected motion vectors from the neighboring macroblocks of the current decoded macroblock in the hypothetical decoded frame segment 13300, which include the left macroblock 13340, the top macroblock 13320, the top left macroblock 13310 and the top right macroblock 13330, are placed in the list 13500 in that respective order. The motion vectors in the list 13500 are then analyzed using the content in macroblock 13450 in a first-in-first out order to obtain an optimal motion vector from the motion vectors inserted into the list 13500, and the optimal motion vector is then assigned as the motion vector of encoded macroblock 13450, which is encoded and transmitted as part of the outgoing video. Transcoding between different block types is discussed in additional detail in U.S. patent application Ser. No. 10/620,329, filed on Jan. 21, 2004, entitled "Method And Apparatus for Handling Video Communications Errors," which is commonly assigned and incorporated by reference herein in its entirety.

The application of the invention is not restricted to the examples shown above, and various combinations of the techniques, which are known to those skilled in the art, are also possible.

In addition to the examples mentioned, there are many variations in which the invention can be applied to the encoding of video, or transcoding of video across different video coding standards or transcoding of video across the same video coding standard. Some of these are mentioned throughout the present specification.

In terms of encoding the sequence of video frames to a compressed video bitstream, the applications are as follow, (1) Deriving multiple children motion vectors from single parent motion vector, for example, deriving the children motion vectors within multiple partitions of a block by first deriving the parent motion vector of the block, or during hierarchical deriving of children video vectors, such as from a parent global motion. The invention is applied in deriving the parent motion vector, using the already derived motion vectors from other blocks in the first case or previous global motion vectors in the second case. The parent motion vector is subsequently used to derive the children motion vectors.

(2) Deriving a single motion vector of a partition within a block with multiple motion vectors directly. The invention is applied in deriving a single motion vector of the partition using the motion vectors of the other partitions as initial potential motion vectors.

In terms of transcoding compressed video bitstream from one format of compressed video bitstream to another format, the applications are as follow, (1) Deriving a motion vector in the block or partition of the outgoing video from the motion vector in the block or partition of the same size in the incoming video. The motion vector in the outgoing video is derived by using the motion vector of the block in the incoming video and the already derived motion vectors of other blocks as initial potential motion vectors, and then using techniques as detailed in the present specification.

(2) Deriving a single motion vector in a block of the outgoing video from the multiple motion vectors in the partitions in a block of the incoming video. Multiple motion vectors in the partitions of a block to single motion vector in a block. For example, in transcoding of H.264 macroblock with multiple partitions to a single H.263 macroblock. In this case, the multiple motion vectors in the partitions are used as initial motion vectors, together with the motion vectors from the incoming video and already encoded motion vectors from the outgoing video.

(3) Deriving the motion vectors for each of the multiple partitions of a block from a block with one or lesser number of partitions. For example, a single motion vector of a macroblock is transcoded to a macroblock with multiple partitions each containing a motion vector in the outgoing video. A parent motion vector is first derived by using motion vectors in the incoming video and the already derived motion vectors of other blocks as initial potential motion vectors and applying the techniques describe in the present specification. The children motion vectors in the partitions are subsequently derived from this parent motion vector.

The invention may also be applied to finding the motion vector in a partition that contains more than one motion vector, for example, in a B frame, wherein one macroblock contains two motion vectors. Other applications of the technique would be recognized by one who is of ordinary skill in the art.

After the initial motion vectors have been inserted into the list, the list will be analyzed. This analysis usually involves motion refinement of each selected motion vector within the list. The embodiment of the invention used in the analysis techniques described in the following paragraph should not be limited to the application described in the present specification.

Fast motion refinement involves searching for motion vector from an initial motion vector, and moving it along a path of greatest descent while calculating the coding cost of using the motion vector, until a final motion vector with lowest coding cost as compared to its neighbors is reached.

When multiple initial motion vectors are used for motion refinement, every motion vector that is near or in the path of a motion refinement for the previous initial motion vector need not be tested, as motion refinement for these motion vectors will most probably give the same result. In one embodiment of the invention, for each motion refinement, a region surrounding the path from an initial motion vector to the refined final motion vector is formed during motion refinement for the motion vector, and any other initial motion vectors that are contained within the region can be eliminated. This is done so as to get a balance between eliminating those redundant motion vectors to reduce computation cost required for their subsequent refinement and yet retaining the initial motion vectors that are possible to lead to an optimal result. This process will be referred to as redundant motion vector elimination. The redundant motion vector elimination can be performed whenever a motion refinement is used, and it is possible that multiple motion refinement processes are performed when analyzing the list of initial motion vectors. Thus, for latter motion vectors in the list, it is possible that two or more regions are tested against for elimination. For each process of motion refinement, the redundant motion vector elimination can further reduce the number of motion vectors in the list. This reduces the number of motion refinement processes subsequently utilized, thereby saving substantial processing and/or computational cost.

Testing a motion vector against every possible position around the path of motion refinement can be computationally intensive. In another embodiment of the invention, a region used for redundant motion elimination can be formed by a rectangular window bounded by the initial motion vector used and final motion vector obtained from motion refinement. Thus during a motion refinement, the initial motion vector and the final motion vectors are recorded, and the other initial motion vector candidates that are within the region containing the initial motion vector and the final motion vector, or the path from the initial motion vector to the final motion vector during motion refinement are eliminated from the list, or they are not being analyzed. This technique effectively removes some of the motion vectors pointed to similar direction in the first few iterations.

Using a single rectangular window region for motion vector elimination increases the chance of eliminating the good initial motion vectors, which leads to the optimal motion vector, if the area of the window is large. In yet another embodiment, the region used for redundant motion elimination can be formed by multiple rectangular windows along the path for motion refinement. For example, a new window can be formed every time the number of steps with which the motion vector was altered during motion refinement exceeds a certain threshold. Thus multiple windows will be formed if the distance between the initial motion vector and final motion vector is large, which aggregately covers the path between the initial motion vector and the final motion vector. On the other hand, increasing the number of windows increases the processing required to analyze and eliminate the appropriate initial motion vectors in the list. In a particular embodiment, only a single rectangular window is used. In other embodiments multiple regions are used, and in some embodiments, the position or the size of the region is adaptively changed based on latter refinements or positioning of motion vectors.

Figure 1B:
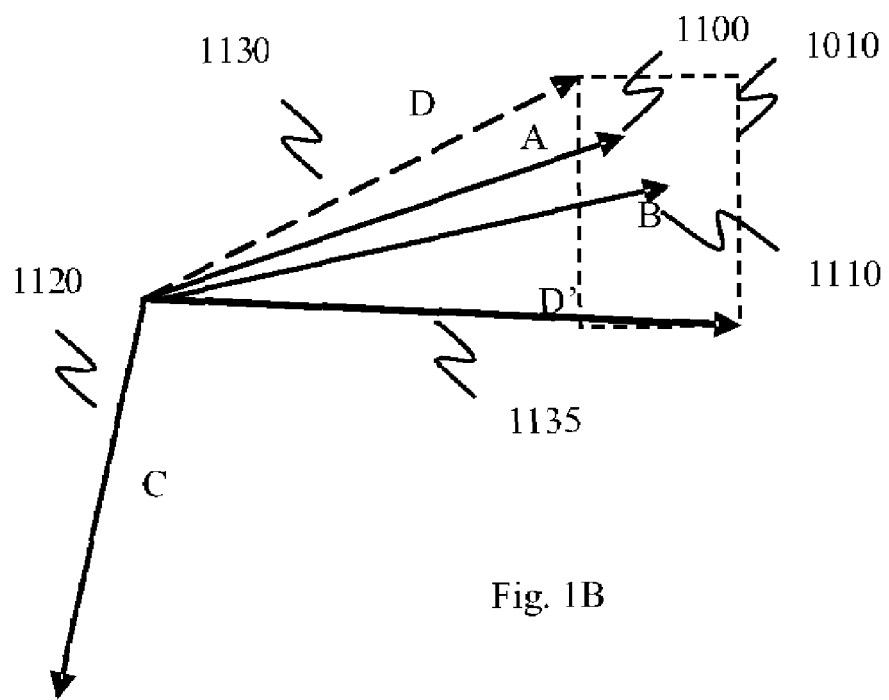
FIG. 1B illustrates the motion vectors and the associated windows formed by refining motion vector D according to an embodiment of the present invention.

An example embodiment of the present invention is given with reference to FIG. 1A and FIG. 1B. With reference to FIG. 1A four motion vectors A, B, C, D indicated by 1000, 1010, 1020, 1030 respectively are extracted from four different blocks and they are used as the initial motion vectors and motion vector D is used first for analysis. The four different blocks are next to each other for illustration purpose. In some cases, they might not be next to each other and can reside in different frame segments. With reference to FIG. 1B, the motion vector D indicated by 1130 is used for refinement to obtain the refined motion vector D' as indicated by 1135. A window region as indicated by 1010 is formed from the coordinates of initial motion vector D and refined motion vector D'. The motion vectors A and B as indicated by 1100 and 1110 respectively fall within the window, and they are thus eliminated from the list of initial motion vectors, leaving only C as indicated by 1120 as the initial motion vector used for the next refinement.

Figure 4:
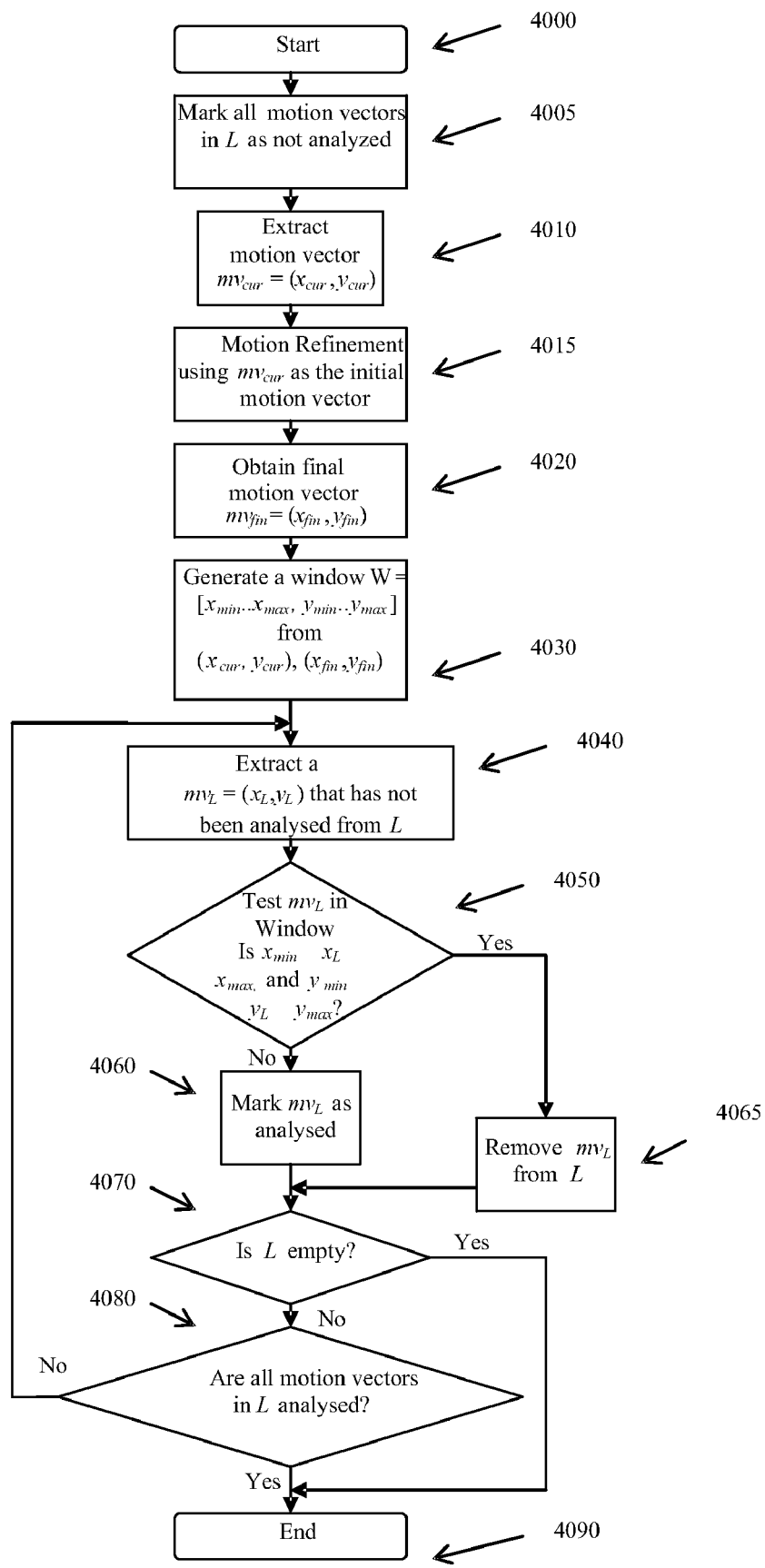
FIG. 4 illustrates a process for the redundant motion vector elimination process using a rectangular window according to an embodiment of the present invention.

An embodiment of the redundant motion vector elimination process using a rectangular window is shown with reference to FIG. 4. The process starts in step 4000. In step 4005, all the motion vectors in the list L of initial motion vectors are marked as not analyzed. The current motion vector $mv_{cur}$ with the value $(x_{cur}, y_{cur})$ is then extracted in step 4010 and used as the initial motion vector for motion refinement in step 4015. The final motion vector $mv_{fin}$ with value $(x_{fin}, y_{fin})$ is obtained after the motion refinement is extracted in step 4020. In a preferred embodiment, fast motion estimation techniques such as a diamond search can be used. One of ordinary skill in the art would recognize other motion estimation techniques can also be used. The window $[x_{min}..x_{max}, y_{min}..y_{max}]$ is then generated from the value of $x_{cur}$, $y_{cur}$, $x_{fin}$ and $y_{fin}$. The simplest way to generate the window is by direct assignment, such that $x_{min}=\min(x_{cur}, x_{fin})$, $x_{max}=\max(x_{cur}, x_{fin})$, $y_{min}=\min(y_{cur}, y_{fin})$, $y_{max}=\max(y_{cur}, y_{fin})$, where the function $\max(i,j)$ denotes the greater of either i or j, while the function min(i,j) denotes the lesser of either i or j. Another way to generate the window is to assign $x_{min}=\min(x_{cur}, x_{fin})-a$, $x_{max}=\max(x_{cur}, x_{fin})+a$, $y_{min}=\min(y_{cur}, y_{fin})-b$, $y_{max}=\max(y_{cur}, y_{fin})+b$, where a and b are constant.

The process then enters a loop to examine each unanalyzed motion vector within the list L. The loop begins with step 4040 that extract a motion vector $mv_L=(x_L, y_L)$ that has not been analyzed from list L. This is followed by decision 4050, where the coordinate $(x_L, y_L)$ is then compared to the window formulated in step 4030. This decision involves determining whether $x_{min} \leq x_L \leq x_{max}$, and $y_{min} \leq y_L \leq y_{max}$. If this is the case, the motion vector $mv_L$ is removed from list L in step 4065 before continuing to decision 4070. If this is not the case, the process continues to step 4060 which marks $mv_L$ as an analyzed motion vector. This is continued to decision 4070 which determines if list L is empty. If list L is empty, the process ends in step 4090. If list L is not empty, the process continues in decision 4080, which determines whether all motion vectors in list L have been analyzed. If this is not the case, the process continues in the loop, and control is passed back to step 4040 to extract a new unanalyzed motion vector and assigned it as $mv_L$. If all initial motion vectors in the list L have been analyzed, the process ended in step 4090.

It is beneficial to reduce the computation cycle of the encoding while this reduction does not degrade the compression performance. One way to achieve this is to reduce the number of initial motion vector for motion refinement. The initial motion vector candidates can be eliminated if they are less probable to refine to one optimal motion vector than the current refined optimal motion vector. To allow this, the coding cost of each initial motion vector can be compared against the coding cost of the initial motion vector which possibly gives the optimal refined motion vector. If the coding cost of an initial motion vector is found to be smaller than the coding cost of the initial motion vector which leads to the optimal refined motion vector, motion refinement is then performed for the initial motion vector. Otherwise the refinement process is terminated early, and the initial motion vector will be ignored. In one embodiment, the sum-of-absolute-difference (SAD) between the luminance partition of a block and a partition in a reference frame pointed to by its respective motion vector. A more accurate but also more complex measurement of the cost is the rate-distortion coding cost of using the motion vector, which involves the SAD value as described earlier and the number of bits used to code the motion vector. Depending on if cycles consumed in processing, quality or bits produced in the output are more important in an application these factors will be weighted accordingly. An example of the early termination for motion refinement is explained with reference to FIG. 2A, FIG. 2B and FIG. 2C. FIG. 2A shows four motion vectors, E, F, G and F, indicated by 2000, 2010, 2020 and 2030 respectively, extracted from four different blocks. The four different blocks are next to each other for illustration purpose. In some cases, they might not be next to each other and can reside in different frame segments. FIG. 2B shows the initial motion vectors, E, F, G and H as indicated by 2100, 2110, 2120, 2130 respectively and their respective refined motion vectors, E', F', G' and H' as indicated by 2105, 2115, 2125 and 2135 respectively after a motion refinement is performed for each of the motion vector. The respective coding costs in terms of SAD values are illustrated with reference to FIG. 2C, with the coding cost of the initial motion vector shows in table 2210 and the coding cost of respective final refined motion vector shows in table 2220. In the case when early termination is applied to refine the motion vector motion vectors E, F, G and H in sequence, initial coding cost of E is first recorded, and since it gives the only final motion vector.

For the next initial motion vector, F, its coding cost ($SAD_F$) is found to be larger than $SAD_E$. Motion refinement is not performed and it is ignored. For the subsequent initial motion vector G, its coding cost ($SAD_G$) is found to be smaller than $SAD_E$. Motion refinement is performed and the coding cost $SAD_{G'}$ of its refined motion vector G' is found to be smaller than $SAD_E$. The coding cost of its initial motion vector, $SAD_G$, is then replaced $SAD_E$ as the testing criteria. Finally, coding cost of motion vector H is compared, and it is found to be larger than $SAD_G$. Thus, motion refinement is not performed on motion vector H.

While there is no guarantee that the initial motion vector with a high coding cost will not result in the refined motion vector with minimal coding cost, the technique is a way to reduce the number of motion vectors to be analyzed so as to reduce computation, or optimize against a performance measure such as bits produced, while reducing the probability of sacrificing a potentially good motion vector. Initial motion vector with low coding cost have a higher probability of getting a final refined motion vector with a low coding cost. On the other hand, initial motion vector with a higher coding cost have a lower probability of getting a refined motion vector with very low coding cost. If it does so, it is probable that multiple SAD comparisons are required to refine it from high coding cost to final refined motion vector with very low coding cost. The early termination technique thus reduces computation by using initial motion vectors more likely to be optimal with low coding cost, and reduce the number of SAD comparison that is required for refining a motion vector with very high comparative coding cost.

Figure 5:
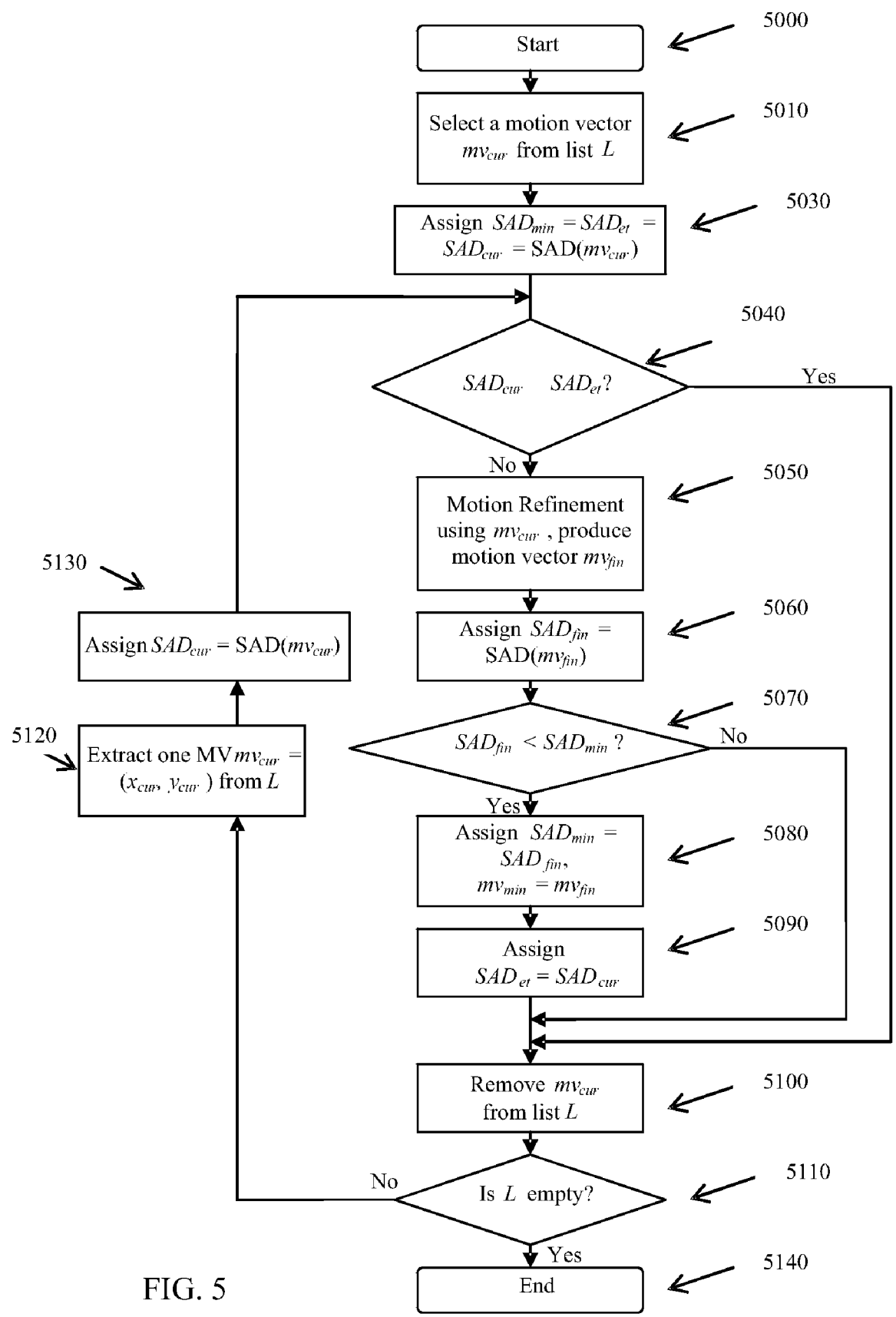
FIG. 5 illustrates a process of an early termination process according to another embodiment of the present invention.

One embodiment of the early termination process is described with reference to FIG. 5. The process starts in step 5000. In step 5010, a current motion vector $mv_{cur}$ is extracted from the list L of initial motion vectors. Following step 5010, the minimum coding cost, $SAD_{min}$, and the coding cost $SAD_{et}$ of the initial motion vector used for early termination, is assigned as the coding cost $SAD_{cur}$ of the current motion vector $mv_{cur}$ in step 5030. A loop is then entered to analyze each motion vector within the list L. The loop begins in decision 5040, to determine if $SAD_{cur}$ is more than $SAD_{et}$. If this is not the case, the process skips the motion refinement step for motion vector $mv_{cur}$ and processed to step 5100 to remove $mv_{cur}$ from list L. If $SAD_{cur}$ is less than $SAD_{et}$, the process continues in step 5050 to perform motion refinement using $mv_{cur}$ as the initial motion vector. In one embodiment, the motion refinement utilizes diamond search technique for fast motion re-estimation. In another embodiment, the motion refinement uses the redundant motion vector elimination technique describes with reference to FIG. 4. After motion refinement, the final coding cost $SAD_{fin}$ is recorded in step 5060 from the coding cost of $mv_{fin}$ generated in step 5050. The process continues in decision 5070, to determine if $SAD_{fin}$ is smaller than $SAD_{cur}$. If this is false, the process continues in step 5100. Otherwise, control is given to step 5080, in which the motion vector $mv_{min}$ with the minimum coding cost is assigned as the $mv_{fin}$ and its respective coding cost $SAD_{min}$ is assigned as $SAD_{fin}$. In addition, the minimum initial motion vector coding cost $SAD_{et}$ used for early termination is recorded as the coding cost $SAD_{cur}$ of the current motion vector used for motion refinement. The process then continues in step 5100 in which $mv_{cur}$ is removed from the list of initial motion vectors L. The process then continues in decision 5110. Decision 5110 determines whether list L is empty. If L is empty, the process breaks out of the loop and ends in step 5140. Otherwise the process continues in the loop and control is passed back to step 5120 to further extract an analyzed motion vector and assigned it as $mv_{cur}$ for analysis.

This is followed by step 5130 where SAD$_{cur}$ is assigned as the coding cost of mv$_{cur}$. The process continues in the loop and control is passed to step 5040.

Redundant motion vector elimination can be combined with an early termination technique to further reduce the computational cycles required to determine the optimal motion vector. In a specific embodiment, each motion vector in the list is analyzed in first-in first-out order. When a motion vector is being analyzed, the coding cost of using the initial motion vector is first obtained, and an early termination of the process pertaining to the motion vector is performed by comparing this coding cost to the coding cost of the initial motion vectors that lead to the most optimal motion vector of the previously analyzed motion vectors. If the coding cost is found to be smaller, the motion refinement process is performed. After the motion refinement, the current optimal motion vector is updated only if the final motion vector is found to be optimal, that is, the coding cost of the final motion vector is smaller than the coding cost of the optimal motion vector recorded so far. In addition, redundant motion vector elimination is performed by forming a window from the information gathered during the motion refinement and eliminating those initial motion vectors in the list which lie within the window. The process is then repeated for those initial motion vectors that remain in the list.

The motion vectors can be obtained from the decoded incoming video stream in the case of transcoding, or previously encoded blocks, in the case of video encoding or re-encoding during transcoding. In the case of transcoding, a single block can be composed of several partitions with different sizes, as allowed in the case of H.264 or AVC video coding standards. In this case, each partition can be predicted from different segments of the reference frame, or even different reference frames, with each partition having its respective motion vector. During the transcoding, the median motion vector of a block from the decoding frame is transferred, to be use as the first initial motion vector for refinement during the re-encoding. In the case where the partition within a block is not of similar size, a typical technique is to split the large partition into numerous partitions with a size of the smallest partition within the block, and duplicates the motion vectors for this partition.

A non-weighted technique for finding motion vector from partition of equal size is then used, although the use of the weighted algorithm with equal weights is still applicable (it might, however, use some additional small amount of computation). In the non-weighted technique, each component (x and y) of the motion vectors is sorted to determine the median value for that component. The two components are then joined together to form the median motion vector. In hardware processing, where computation resource is limited, sorting can be expensive, especially when a large number of motion vectors are generated when the smallest partition is several times smaller than the largest partition within the block. In this case, the large partition is broken into many equal size blocks, and the x and y components of the motion vectors of the smaller partition with equal size are sorted separately to obtain the median x and median y value. The two components are then combined to form a median motion vector.

The non-weighted technique can be applied to find a median motion vector within a macroblock, which is defined in many video standards as 16×16 pixels. In this case, its partition can be an 8×8 pixel block within the macroblock. Partitions can also be of sizes such as 16×8, 8×16, 8×4, 4×8, 4×4, and the like. The non-weighted technique can be applied to finding a median motion vector within a block of a macroblock, a block being defined in many video standards as 8×8 pixels. Its partitions can be of sizes 8×4, 4×8 and 4×4.

Figure 6A:
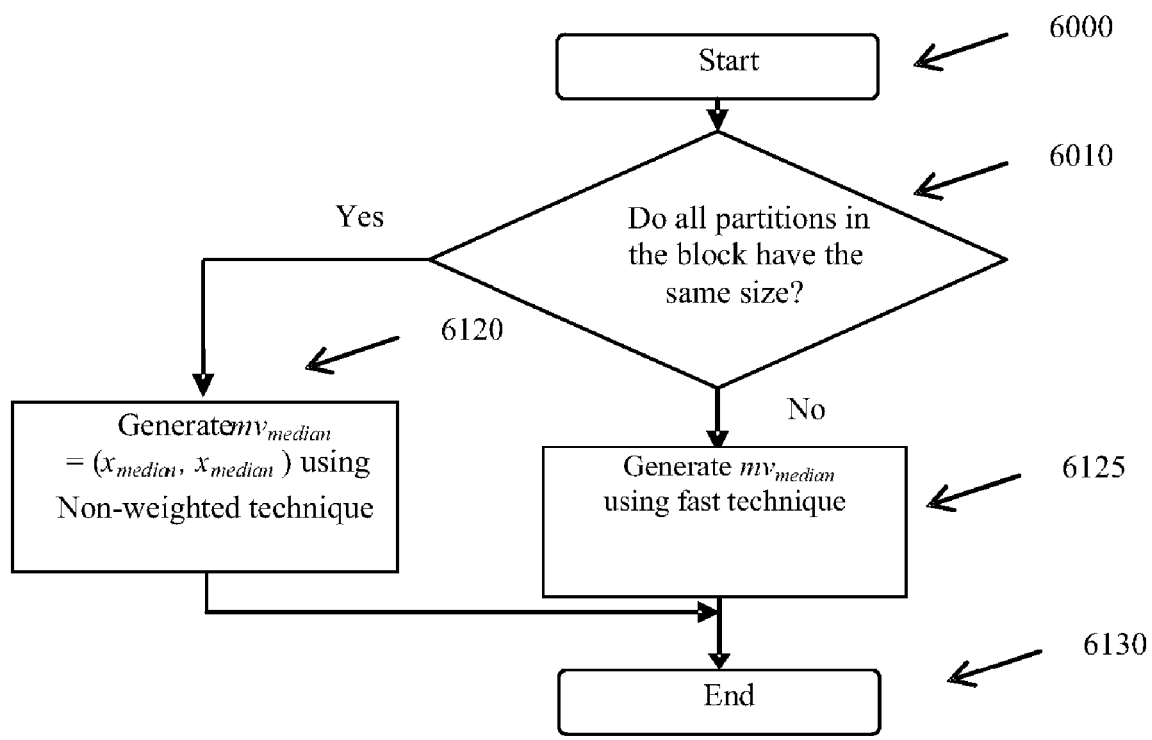
FIG. 6A illustrates a process of estimating the median motion using the size of the partition that the motion vector is associated with according to an embodiment of the present invention.

A less computationally intensive technique for estimating median motion is disclosed with reference to FIG. 6A. In this case, the size of the partition which the motion vector is associated with is used in finding the median motion vector. The process begins in step 6000. Decision 6010 checks whether all the partition in the block are the same size. If this is the case, a non-weighted technique to extract the median motion vector can be applied in step 6120 before the process terminates at step 6130. One technique includes separating the x component and the y component into two lists separately, and sorting them in the respective list. The median motion vector is then formed by selecting the x and y component from the respective list. If at least one partition in the block does not have the same size as the rest of the partitions in the block, the technique to determine the median motion vector of unequal partition size is used. If decision 6010 determines that not all partitions in the block have the same size, the process continues in step 6125, whereby the median motion vector is generated by a fast technique, as is further explained with reference to FIG. 6B. Subsequently, the process terminates in step 6130.

Figure 6B:
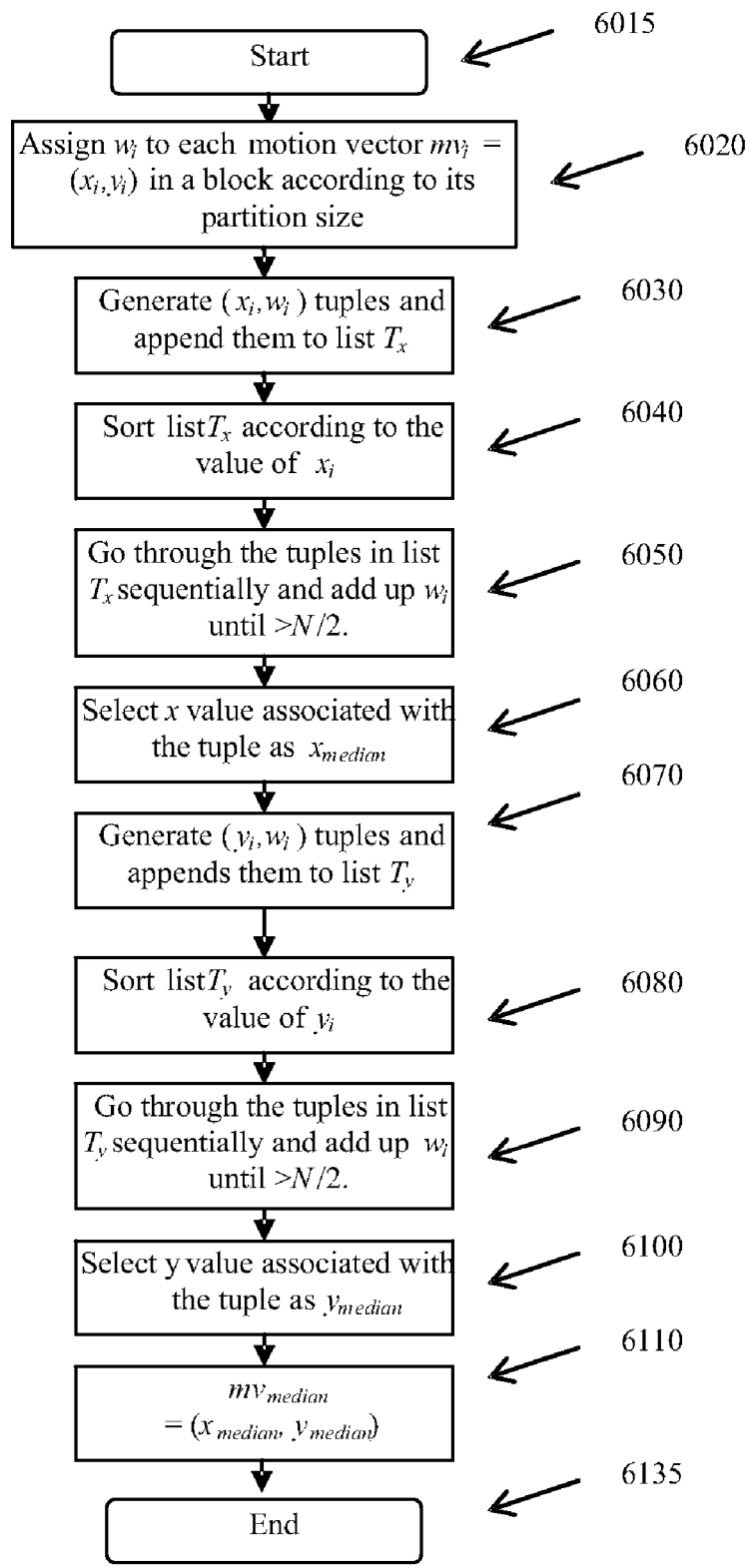
FIG. 6B illustrates another process of estimating the median motion according to an embodiment of the present invention.

The fast technique for estimating median motion vector shown as step 6125 with reference to FIG. 6A is illustrated with reference to FIG. 6B. The process begins in step 6015 and continues to step 6020 to assign weight w$_i$ to each motion vector mv$_i$=(x$_i$, y$_i$) in a block according to its partition size, that is, the weight can be equal to the area which the partition occupied. Step 6020 through 6110 describes a process for generating the median motion vector using the partition size for sorting, with step 6030 through to step 6060 describes a process for generating the x component of the median motion vector and step 6070 through to step 6100 describes a process for generating the y component of the median motion vector. A tuple (x$_i$, w$_i$) is then formed from x component of mv$_i$ and associated weight w$_i$ of each partition i in step 6030, and all the tuples are then appended to a list T$_x$. In step 6040, the list is sorted according to the value of x. Following step 6040, the value of w$_i$ in each tuple is added up sequentially until its value is just greater than N/2, where N is the sum of all weights in the partition in step 6050, and the tuple in this point is selected. The x component of the selected tuple assigned as the x component x$_{median}$ of the median motion vector in step 6060. The process continues to extract y component of the median motion vector. A tuple (y$_i$, w$_i$) is then formed from y component of mv$_i$ and associated weight w$_i$ of each partition i in step 6070, and all the tuples are then appended to a list T$_y$. In step 6080, the list is sorted according to the value of y. Following step 6080, the value of w$_i$ in each tuple is added up sequentially until its value is just greater than N/2 in step 6090, where N is the sum of all weights in the partition, and the tuple in this point is selected. The y component of the selected tuple assigned as the y component y$_{median}$ of the median motion vector in step 6100. In step 6110, the mv$_{median}$ is created by combining x$_{median}$ obtained from step 6060 and y$_{median}$ obtained from step 6100. Finally, the process ends in step 6135.

Figure 14:
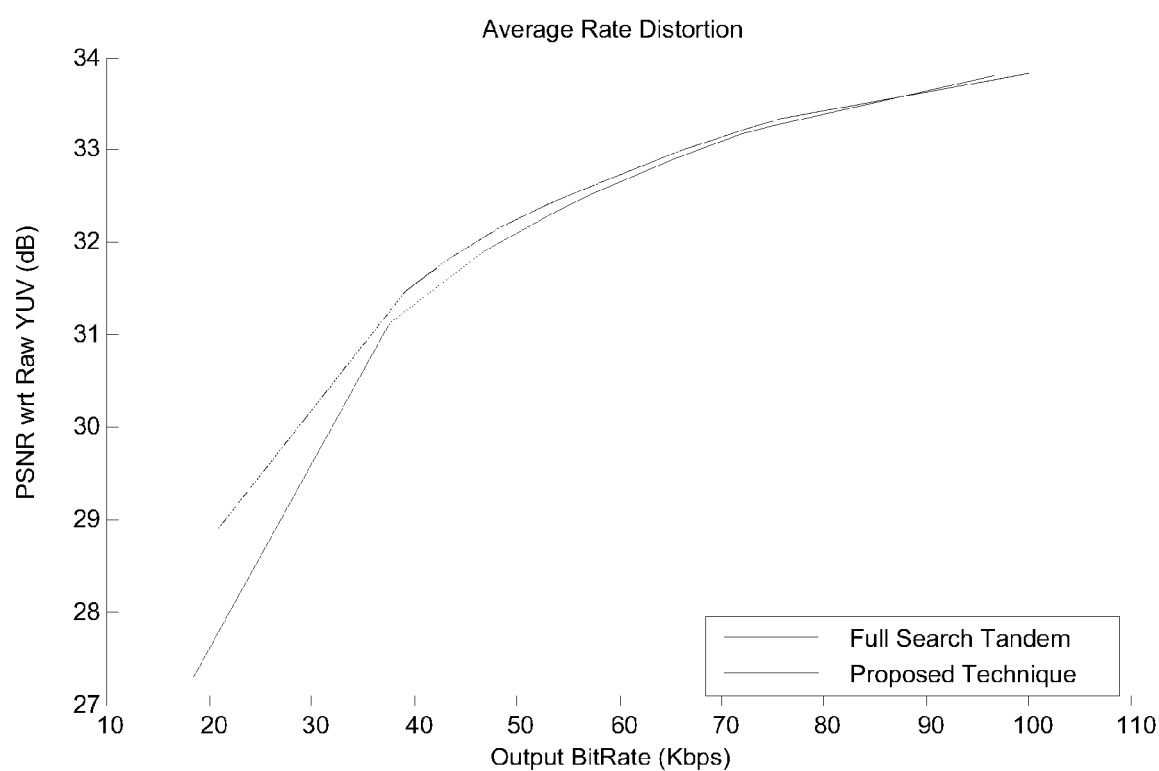
FIG. 14 is a rate distortion graph illustrating a rate distortion performance of an H.264 to H.263 transcoding implementation using techniques provided by embodiments of the present invention compared with a rate distortion performance of a full search tandem transcoder.

The performance of a preferred embodiment showed a result in a form of rate distortion graph is shown in FIG. 14 and execution time in FIG. 15. The rate distortion graph demonstrates the relative performance of the encoding or transcoding technique by plotting the distortion in the form of peak signal to noise ratio (PSNR) against the bitrate of the encoded or transcoded video, and its implication should be familiar to those skilled in the art. Here, the average result of the implementation of one of the embodiment for transcoding the H.264 bitstream to H.263 bitstream, known as H.264 to H.263 transcoder here, is compared against the result of the full search tandem transcoding. The full search tandem transcoding is achieved by decoding the H.264 bitstream using standard H.264 decoder to full frame and re-encode the frame using standard H.263 encoder, using full search motion vector estimation, which is considered to be one of the most accurate but most expensive operations for motion estimation. The H.264 to H.263 transcoder is constructed by decoding H.264 bitstream and re-encoding it using H.263 transcoder with motion re-estimation technique implemented in accordance with the all the techniques described in invention in the ordinary mode. The two techniques are applied on the same set of test data, and the rate distortion result is averaged and is plotted in FIG. 14. The figure shows that the rate distortion performance of the H.264 to H.263 transcoder is close to that of the full search transcoding.

For execution speed evaluation, the experiment is performed on TI 320C64x DSP using a QCIF sequence with 149 frames assuming a frame rate of 10 fps. The execution cycle illustrated with reference to FIG. 15 shows that the H.264 to H.263 transcoding using the invention is faster than that of the transcoding using full search motion estimation with 32×32 search range for the same sequence by a factor of 2.4.

What is claimed is:

1. A method of eliminating a motion vector from a set of motion vectors for a block in an encoding process, the method comprising:
   providing the set of motion vectors for the block;
   selecting an initial motion vector from the set of motion vectors;
   providing an intermediate motion vector using a motion vector search process, the motion vector search process using, in part, the initial motion vector;
   forming a motion vector elimination region defined by one or more parameters associated with the initial motion vector and one or more parameters associated with the intermediate motion vector;
   selecting an additional motion vector from the set of motion vectors for the block;
   determining if the additional motion vector points into the motion vector elimination region; and
   eliminating the additional motion vector from the set of motion vectors if the additional motion vector points into the motion vector elimination region.

2. The method of claim 1 wherein the encoding process comprises a transcoding process.

3. The method of claim 2 wherein at least one motion vector from the set of motion vectors is retrieved from a video bitstream input into the transcoding process.

4. The method of claim 1 wherein at least one motion vector from the set of motion vectors has been already encoded in another part of the encoding process.

5. The method of claim 1 wherein providing the set of motion vectors comprises obtaining a motion vector from at least one of a decoder or an encoder.

6. The method of claim 1 further comprising ordering the set of motion vectors to provide an ordered list.

7. The method of claim 1 wherein the motion vector elimination region comprises a rectangular region having a first corner associated with the initial motion vector and a second corner associated with the intermediate motion vector.

8. The method of claim 1 wherein the motion vector elimination region comprises a path passing from an area associated with the initial motion vector to an area associated with the intermediate motion vector.

9. The method of claim 8 wherein the path is associated with the motion vector search process.

10. The method of claim 1 wherein the one or more parameters associated with the initial motion vector comprise components of the initial motion vector.

11. The method of claim 1 wherein the one or more parameters associated with the intermediate motion vector comprise components of the intermediate motion vector.

12. The method of claim 1 wherein the motion vector search process comprises a motion vector search process operating in a window smaller than a frame.

13. The method of claim 1 wherein eliminating the additional motion vector comprises an indication that a motion vector search will not be performed on the additional motion vector.

14. The method of claim 1 further comprising forming a second motion vector elimination region defined by one or more parameters associated with a further motion vector.

15. The method of claim 1 further comprising modifying an extent of the motion vector elimination region.

16. The method of claim 15 wherein modifying the extent of the motion vector elimination region is associated with a further motion vector search process.

17. The method of claim 1 wherein the motion vector search process comprises a motion vector estimation process.

18. The method of claim 1 wherein the motion vector search process comprises a motion vector refinement process.

19. The method of claim 1 wherein the motion vector elimination region comprises two or more rectangular regions which aggregately cover a path between the initial motion vector and the intermediate motion vector.

20. The method of claim 1 wherein the initial motion vector is different to the additional motion vector.

21. The method of claim 1 wherein the set of motion vectors comprises of two or more motion vectors.

22. The method of claim 1 wherein eliminating the additional motion vector comprises removing the additional motion vector from an analysis list.

* * * * *